United States Patent
Wang et al.

(10) Patent No.: US 10,873,436 B2
(45) Date of Patent: Dec. 22, 2020

(54) DATA COMMUNICATION METHOD AND RELATED APPARATUS

(71) Applicant: HUAWEI TECHNOLOGIES CO., LTD., Shenzhen, Guangdong (CN)

(72) Inventors: Ningjuan Wang, Shenzhen (CN); Xin Xue, Shenzhen (CN); Min Yan, Shenzhen (CN); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/390,333

(22) Filed: Apr. 22, 2019

(65) Prior Publication Data

US 2019/0245669 A1    Aug. 8, 2019

Related U.S. Application Data

(63) Continuation of application No. 15/468,593, filed on Mar. 24, 2017, which is a continuation of application No. PCT/CN2014/087403, filed on Sep. 25, 2014.

(51) Int. Cl.
*H04L 5/00* (2006.01)
*H04B 7/00* (2006.01)
(Continued)

(52) U.S. Cl.
CPC .............. *H04L 5/0053* (2013.01); *H04B 7/00* (2013.01); *H04B 7/24* (2013.01); *H04L 65/4076* (2013.01); *H04W 56/005* (2013.01); *H04W 84/12* (2013.01)

(58) Field of Classification Search
CPC .................................................... H04L 5/0053
See application file for complete search history.

(56) References Cited

U.S. PATENT DOCUMENTS 8,565,082 B1    10/2013   Vargantwar et al.
8,665,908 B1     3/2014   Zhang et al.
(Continued)

FOREIGN PATENT DOCUMENTS

CN       1618054 A      5/2005
CN     100373829 C      3/2008
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz; Dec. 18, 2013; 425 pages.
(Continued)

*Primary Examiner* — Andrew Lai
*Assistant Examiner* — Andrew C Lee
(74) *Attorney, Agent, or Firm* — Slater Matsil, LLP

(57) ABSTRACT

An access device constructs a beacon frame, where the beacon frame includes a newly added field, and the newly added field represents multiple data guard interval lengths supported by the access device. The access device broadcasts the beacon frame, so that a terminal selects an available guard interval length matching a data guard interval length supported by the terminal from the beacon frame, and performs data communication with the access device by using the available guard interval length. Data communication between the access device and the terminal can be implemented when the access device supports multiple data guard interval lengths.

20 Claims, 19 Drawing Sheets

(51) Int. Cl.
*H04W 56/00* (2009.01)
*H04B 7/24* (2006.01)
*H04L 29/06* (2006.01)
*H04W 84/12* (2009.01)

(56) References Cited

U.S. PATENT DOCUMENTS

| | | | |
|---|---|---|---|
| 9,065,502 | B2 | 6/2015 | Lee et al. |
| 9,220,061 | B2* | 12/2015 | Kim .................. H04W 52/0206 |
| 9,467,890 | B2 | 10/2016 | Choi et al. |
| 9,871,683 | B2 | 1/2018 | Choi et al. |
| 9,961,678 | B2* | 5/2018 | Li ....................... H04L 27/2602 |
| 2005/0018638 | A1 | 1/2005 | Lindskog et al. |
| 2005/0147075 | A1 | 7/2005 | Terry |
| 2005/0180353 | A1 | 8/2005 | Hansen et al. |
| 2006/0250940 | A1 | 11/2006 | Tirkkonen et al. |
| 2007/0079339 | A1 | 4/2007 | Hanabusa |
| 2008/0117879 | A1 | 5/2008 | Wu et al. |
| 2009/0147867 | A1 | 6/2009 | Okamoto et al. |
| 2009/0279619 | A1 | 11/2009 | Yang et al. |
| 2010/0111220 | A1 | 5/2010 | Rouquette-Leveil et al. |
| 2010/0260159 | A1* | 10/2010 | Zhang ..................... H04L 1/009 370/338 |
| 2011/0070836 | A1 | 3/2011 | Park et al. |
| 2011/0085612 | A1 | 4/2011 | Muraoka et al. |
| 2011/0194475 | A1 | 8/2011 | Kim et al. |
| 2012/0155378 | A1 | 6/2012 | Kim et al. |
| 2012/0269124 | A1 | 10/2012 | Porat |
| 2013/0315218 | A1 | 11/2013 | Cheong et al. |
| 2014/0204891 | A1 | 7/2014 | Park et al. |
| 2014/0229808 | A1 | 8/2014 | Van Nee et al. |
| 2014/0294020 | A1 | 10/2014 | You et al. |
| 2014/0307650 | A1* | 10/2014 | Vermani .............. H04L 27/261 370/329 |
| 2014/0328270 | A1* | 11/2014 | Zhu ..................... H04W 74/002 370/329 |
| 2014/0348047 | A1* | 11/2014 | Park .................. H04W 52/0206 370/311 |
| 2014/0348097 | A1* | 11/2014 | Park ..................... H04L 1/0009 370/329 |
| 2014/0362935 | A1* | 12/2014 | Porat ....................... H04L 5/003 375/260 |
| 2015/0009894 | A1* | 1/2015 | Vermani ............. H04L 27/2602 370/329 |
| 2015/0023335 | A1* | 1/2015 | Vermani .............. H04B 7/0452 370/338 |
| 2015/0071272 | A1 | 3/2015 | Vermani et al. |
| 2015/0071372 | A1* | 3/2015 | Zhang ................. H04L 27/2626 375/295 |
| 2015/0098447 | A1 | 4/2015 | Kim et al. |
| 2015/0131640 | A1 | 5/2015 | Seok et al. |
| 2015/0139089 | A1 | 5/2015 | Azizi et al. |
| 2015/0139118 | A1* | 5/2015 | Azizi ................. H04W 72/0406 370/329 |
| 2015/0139206 | A1 | 5/2015 | Azizi et al. |
| 2015/0349995 | A1* | 12/2015 | Zhang .................. H04L 1/0042 375/295 |
| 2015/0365263 | A1* | 12/2015 | Zhang .................. H04L 5/0046 375/295 |
| 2015/0373758 | A1 | 12/2015 | Kim et al. |
| 2016/0072654 | A1 | 3/2016 | Choi et al. |
| 2016/0088665 | A1 | 3/2016 | Kim et al. |
| 2016/0173662 | A1 | 6/2016 | Seok |
| 2016/0302156 | A1 | 10/2016 | Choi et al. |
| 2017/0027001 | A1 | 1/2017 | Choi et al. |
| 2017/0149540 | A1 | 5/2017 | Lee et al. |
| 2017/0279864 | A1* | 9/2017 | Chun .................... H04L 1/0009 |
| 2017/0280462 | A1 | 9/2017 | Chun et al. |
| 2017/0303280 | A1 | 10/2017 | Chun et al. |
| 2018/0123758 | A1 | 5/2018 | Lee et al. |

FOREIGN PATENT DOCUMENTS

| | | |
|---|---|---|
| EP | 0617531 A1 | 3/1994 |
| JP | 2008536426 | 9/2008 |
| JP | 2008536426 A | 9/2008 |
| WO | 2006109134 A1 | 10/2006 |
| WO | 2006190134 | 10/2006 |
| WO | 2007023913 | 3/2007 |
| WO | 2007023913 A1 | 3/2007 |
| WO | 2013/085270 A1 | 6/2013 |
| WO | 2013/089404 | 6/2013 |
| WO | 2013085270 A1 | 6/2013 |
| WO | 2013089404 A1 | 6/2013 |
| WO | 2014043463 A2 | 3/2014 |
| WO | 2014/113537 A1 | 7/2014 |
| WO | 2014113537 A1 | 7/2014 |
| WO | 2014130702 A1 | 8/2014 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput; Oct. 29, 2009; 536 pages.
Notice of Reasons for Rejection, dated May 22, 2018, in Japanese Application No. 2017516288, 6 pages.
Extended European Search Report dated Aug. 3, 2017 in corresponding European Patent Application No. 14902301.2, 5 pages.
Korean Office Action dated Apr. 21, 2018 in corresponding Korean Patent Application No. 10-2017-7010881, 7 pages.
IEEE Standard for Information technology—Local and metropolitan area networks—Specific requirements—Part 11: "Wireless LAN Medium Access Control (MAC)and Physical Layer (PHY) Specifications Amendment 5: Enhancements for Higher Throughput," pp. 1-565, Oct. 29, 2009.
IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz., pp. 1-425, Dec. 18, 2013.
Extended European Search Report dated Aug. 3, 2017 in corresponding European Patent Application No. 14902301.2.
International Search Report dated Jun. 26, 2015 in corresponding International Application No. PCT/CN2014/087403.
Notice of Reasons for Rejection, dated May 22, 2018, in Japanese Application No. 2017516288 (6 pp.).
Korean Office Action dated Apr. 21, 2018 in corresponding Korean Patent Application No. 10-2017-7010881.
Office Action for U.S. Appl. No. 15/468,593 dated Aug. 6, 2018.
Final Office Action for U.S. Appl. No. 15/468,593 dated Jan. 23, 2019.
U.S. Appl. No. 15/468,593, filed Mar. 24, 2017, Ningjuan Wang, Huawei Technologies Co., Ltd.
Chun, et al., U.S. Appl. No. 62/042,759, filed Aug. 27, 2014.

* cited by examiner

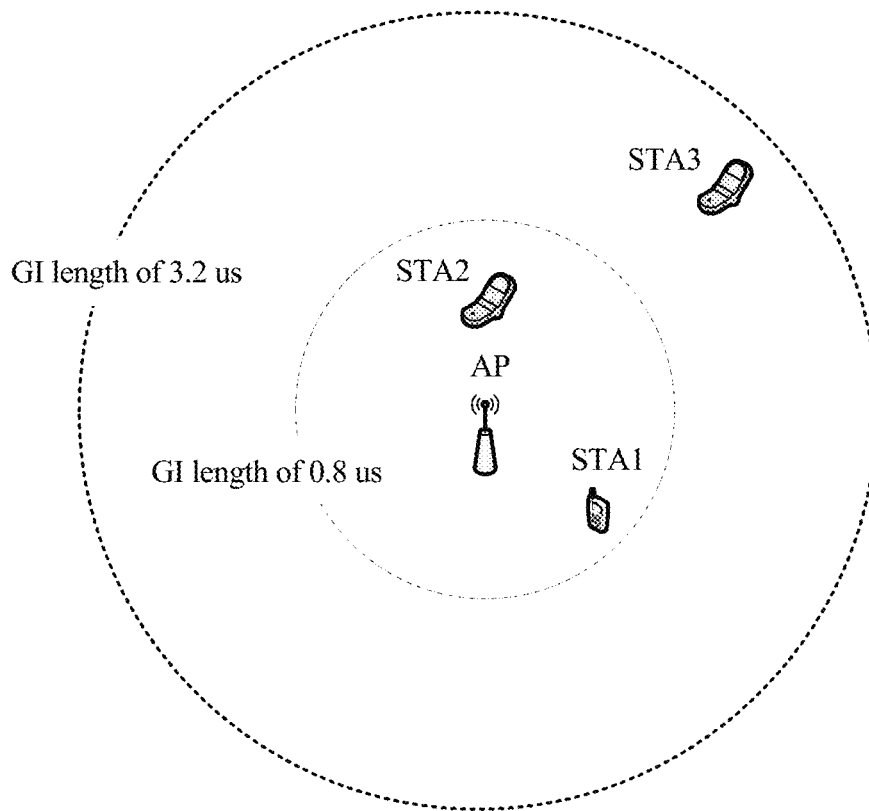

FIG. 1

An access device constructs a beacon frame, where the beacon frame includes a newly added field, and the newly added field represents multiple data guard interval lengths supported by the access device — S100

The access device broadcasts the beacon frame, so that a terminal selects an available guard interval length matching a data guard interval length supported by the terminal from the beacon frame, and performs data communication with the access device by using the available guard interval length — S101

FIG. 2

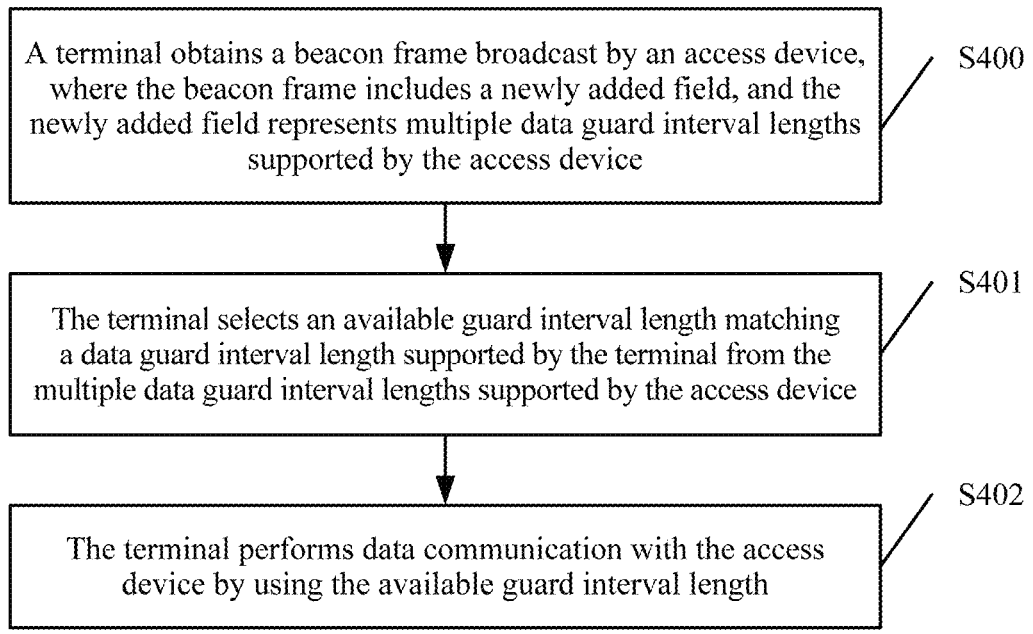
FIG. 5
| Element ID | Length | HE capability information | HE supports GI | Other |
FIG. 6
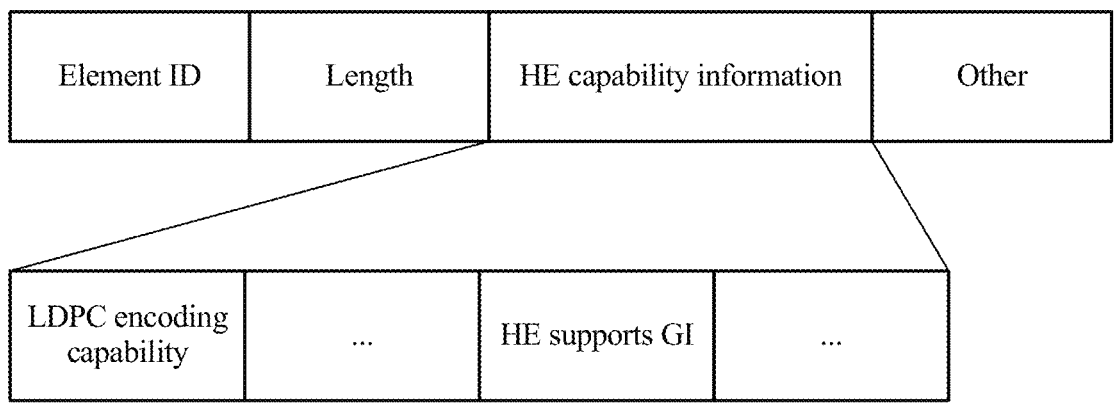
FIG. 7

| Bandwidth | Supported data GI length |
|---|---|
| *20 MHz* | *0.4 us, 0.8 us, 1.2 us, 1.6 us, 2.0 us, ..., 3.2 us, ...4.0 us, ...* |
| *40 MHz* | *0.4 us, 0.8 us, 1.2 us, 1.6 us, 2.0 us, ..., 3.2 us, ...4.0 us, ...* |
| *80 MHz* | *0.4 us, 0.8 us, 1.2 us, 1.6 us, 2.0 us, ..., 3.2 us, ...4.0 us, ...* |
| *160 MHz* | *0.4 us, 0.8 us, 1.2 us, 1.6 us, 2.0 us, ..., 3.2 us, ...4.0 us, ...* |

FIG. 8

| N (serial number) | Indicator bit | 20 MHz | 40 MHz | 80 MHz | 160 MHz |
|---|---|---|---|---|---|
| 1 | 000 | - | 0.4 us | 0.4 us | - |
| 2 | 001 | 0.8 us | 0.8 us | 0.8 us | - |
| 3 | 010 | 1.2 us | 1.2 us | 1.2 us | 1.2 us |
| 4 | 100 | 1.6 us | 1.6 us | 1.6 us | 1.6 us |
| 5 | 101 | 2.4 us | 2.4 us | 2.4 us | 2.4 us |
| 6 | 110 | 3.2 us | 3.2 us | 3.2 us | 3.2 us |

FIG. 9

| Bandwidth | min_GI | N (serial number) | Indicator bit |
|---|---|---|---|
| 20 MHz | 0.8 us | 2 | 001 |
| 40 MHz | 0.4 us | 1 | 000 |
| 80 MHz | 0.4 us | 1 | 000 |
| 160 MHz | 1.2 us | 3 | 010 |

FIG. 10

| Bit | Sub-field | Definition | Encoding |
|---|---|---|---|
| B0–B2 | 20 MHz GI_Idx | If a GI length of a 20 MHz PPDU format is greater than or equal to a length indicated by the GI_Idx, receiving is supported | 000=0.4 us<br>001=0.8 us<br>010=1.2 us<br>100=1.6 us<br>101=2.4 us<br>110=3.2 us |
| B3–B5 | 40 MHz GI_Idx | If a GI length of a 40 MHz PPDU format is greater than or equal to a length indicated by the GI_Idx, receiving is supported | 000=0.4 us<br>001=0.8 us<br>010=1.2 us<br>100=1.6 us<br>101=2.4 us<br>110=3.2 us |
| B6–B8 | 80 MHz GI_Idx | If a GI length of an 80 MHz PPDU format is greater than or equal to a length indicated by the GI_Idx, receiving is supported | 000=0.4 us<br>001=0.8 us<br>010=1.2 us<br>100=1.6 us<br>101=2.4 us<br>110=3.2 us |
| B9–B11 | 160 MHz GI_Idx | If a GI length of a 160 MHz PPDU format is greater than or equal to a length indicated by the GI_Idx, receiving is supported | 000=0.4 us<br>001=0.8 us<br>010=1.2 us<br>100=1.6 us<br>101=2.4 us<br>110=3.2 us |

FIG. 12

| Bit | Sub-field | Definition | Encoding |
|---|---|---|---|
| B0 | GI_0.4 | whether receiving a 0.4 us GI in a PPDU format is supported | 0=not supported<br>1=supported |
| B1 | GI_0.8 | whether receiving a 0.8 us GI in a PPDU format is supported | 0=not supported<br>1=supported |
| B2 | GI_1.2 | whether receiving a 1.2 us GI in a PPDU format is supported | 0=not supported<br>1=supported |
| B3 | GI_1.6 | whether receiving a 1.6 us GI in a PPDU format is supported | 0=not supported<br>1=supported |
| B4 | GI_2.0 | whether receiving a 2.0 us GI in a PPDU format is supported | 0=not supported<br>1=supported |
| B5 | GI_2.4 | whether receiving a 2.4 us GI in a PPDU format is supported | 0=not supported<br>1=supported |
| B6 | GI_2.8 | whether receiving a 2.8 us GI in a PPDU format is supported | 0=not supported<br>1=supported |
| B7 | GI_3.2 | whether receiving a 3.2 us GI in a PPDU format is supported | 0=not supported<br>1=supported |

FIG. 14

| 20 MHz | 40 MHz | 80 MHz | 160 MHz |
|--------|--------|--------|---------|
| 0.4 us | 0.4 us | 0.4 us | 0.4 us  |
| 0.8 us | 0.8 us | 0.8 us | 0.8 us  |
| 1.6 us | 1.6 us | 1.6 us | 1.6 us  |
| 2.4 us | 2.4 us | 2.4 us | 2.4 us  |
| 3.2 us | 3.2 us | 3.2 us | 3.2 us  |

| Field | Bit | Description |
|---|---|---|
| Element ID | | |
| Length | | |
| HE capability information | B0 | 0.4 us GI for 20 MHz |
| | B1 | 0.8 us GI for 20 MHz |
| | B2 | 1.2 us GI for 20 MHz |
| HE supports GI | B3 | 1.6 us CP for 20 MHz |
| | B4 | 2.4 us CP for 20 MHz |
| | B5 | 3.2 us CP for 20 MHz |
| | B6 | 0.4 us CP for 40 MHz |
| | B7 | 0.8 us CP for 40 MHz |
| | B8 | 1.2 us CP for 40 MHz |
| | B9 | 1.6 us CP for 40 MHz |
| | B10 | 2.4 us CP for 40 MHz |
| | B11 | 3.2 us CP for 40 MHz |
| Other | B12 | 0.4 us CP for 80 MHz |
| | B13 | 0.8 us CP for 80 MHz |
| | B14 | 1.2 us CP for 80 MHz |
| | B15 | 1.6 us CP for 80 MHz |
| | B16 | 2.4 us CP for 80 MHz |
| | B17 | 3.2 us CP for 80 MHz |
| | B18 | 0.4 us CP for 160 MHz |
| | B19 | 0.8 us CP for 160 MHz |
| | B20 | 1.2 us CP for 160 MHz |
| | B21 | 1.6 us CP for 160 MHz |
| | B22 | 2.4 us CP for 160 MHz |
| | B23 | 3.2 us CP for 160 MHz |

| Bit | Sub-field | Definition | Encoding |
|---|---|---|---|
| B0 | 20 MHz GI_0.4 | whether receiving a 0.4 us GI in a 20 MHz PPDU format is supported | 0=not supported 1=supported |
| B1 | 20 MHz GI_0.8 | whether receiving a 0.8 us GI in a 20 MHz PPDU format is supported | 0=not supported 1=supported |
| B2 | 20 MHz GI_1.2 | whether receiving a 1.2 us GI in a 20 MHz PPDU format is supported | 0=not supported 1=supported |
| B3 | 20 MHz GI_1.6 | whether receiving a 1.6 us GI in a 20 MHz PPDU format is supported | 0=not supported 1=supported |
| B4 | 20 MHz GI_2.4 | whether receiving a 2.4 us GI in a 20 MHz PPDU format is supported | 0=not supported 1=supported |
| B5 | 20 MHz GI_3.2 | whether receiving a 3.2 us GI in a 20 MHz PPDU format is supported | 0=not supported 1=supported |
| B6 | 40 MHz GI_0.4 | whether receiving a 0.4 us GI in a 40 MHz PPDU format is supported | 0=not supported 1=supported |
| B7 | 40 MHz GI_0.8 | whether receiving a 0.8 us GI in a 40 MHz PPDU format is supported | 0=not supported 1=supported |
| B8 | 40 MHz GI_1.2 | whether receiving a 1.2 us GI in a 40 MHz PPDU format is supported | 0=not supported 1=supported |
| B9 | 40 MHz GI_1.6 | whether receiving a 1.6 us GI in a 40 MHz PPDU format is supported | 0=not supported 1=supported |
| B10 | 40 MHz GI_2.4 | whether receiving a 2.4 us GI in a 40 MHz PPDU format is supported | 0=not supported 1=supported |
| B11 | 40 MHz GI_3.2 | whether receiving a 3.2 us GI in a 40 MHz PPDU format is supported | 0=not supported 1=supported |
| B12 | 80 MHz GI_0.4 | whether receiving a 0.4 us GI in an 80 MHz PPDU format is supported | 0=not supported 1=supported |

FIG. 17A

| B13 | 80 MHz GI_0.8 | whether receiving a 0.8 us GI in an 80 MHz PPDU format is supported | 0=not supported 1=supported |
|---|---|---|---|
| B14 | 80 MHz GI_1.2 | whether receiving a 1.2 us GI in an 80 MHz PPDU format is supported | 0=not supported 1=supported |
| B15 | 80 MHz GI_1.6 | whether receiving a 1.6 us GI in an 80 MHz PPDU format is supported | 0=not supported 1=supported |
| B16 | 80 MHz GI_2.4 | whether receiving a 2.4 us GI in an 80 MHz PPDU format is supported | 0=not supported 1=supported |
| B17 | 80 MHz GI_3.2 | whether receiving a 3.2 us GI in an 80 MHz PPDU format is supported | 0=not supported 1=supported |
| B18 | 160 MHz GI_0.4 | whether receiving a 0.4 us GI in a 160 MHz PPDU format is supported | 0=not supported 1=supported |
| B19 | 160 MHz GI_0.8 | whether receiving a 0.8 us GI in a 160 MHz PPDU format is supported | 0=not supported 1=supported |
| B20 | 160 MHz GI_1.2 | whether receiving a 1.2 us GI in a 160 MHz PPDU format is supported | 0=not supported 1=supported |
| B21 | 160 MHz GI_1.6 | whether receiving a 1.6 us GI in a 160 MHz PPDU format is supported | 0=not supported 1=supported |
| B22 | 160 MHz GI_2.4 | whether receiving a 2.4 us GI in a 160 MHz PPDU format is supported | 0=not supported 1=supported |
| B23 | 160 MHz GI_3.2 | whether receiving a 3.2 us GI in a 160 MHz PPDU format is supported | 0=not supported 1=supported |

FIG. 17B

| Field | Description | Length |
|---|---|---|
| L-STF | Legacy short training field | 32 us |
| L-LTF | Legacy long training field | 32 us |
| L-SIG | Legacy signaling field | 16 us |
| HE-SIG | High efficiency signaling A field | 16 us |
| HE-STF | High efficiency short training field | 16 us |
| Data | Data field carrying a PSDU | Data element quantity *signal length |

| Field | Description | Length |
|---|---|---|
| L-STF | Legacy short training field | 8 us |
| L-LTF | Legacy long training field | 8 us |
| L-SIG | Legacy signaling field | 4 us |
| HE-SIG | High efficiency signaling A field | 16 us |
| HE-STF | High efficiency short training field | 16 us |
| Data | Data field carrying a PSDU | Data element quantity *signal length |

| Field name | Description | Length |
|---|---|---|
| HE-SIG | High efficiency signaling A field | 16 us |
| HE-STF | High efficiency short training field | 16 us |
| Data | Data field carrying a PSDU | Data element quantity *signal length |
FIG. 24
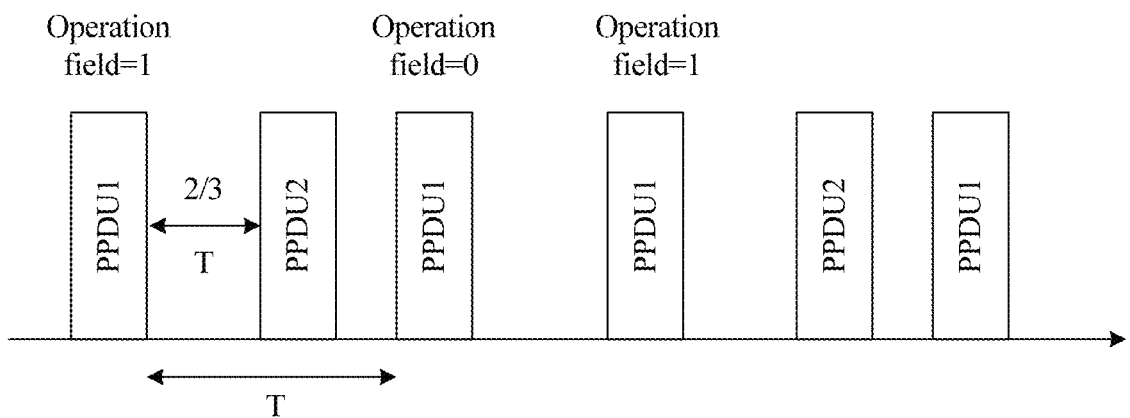
FIG. 25
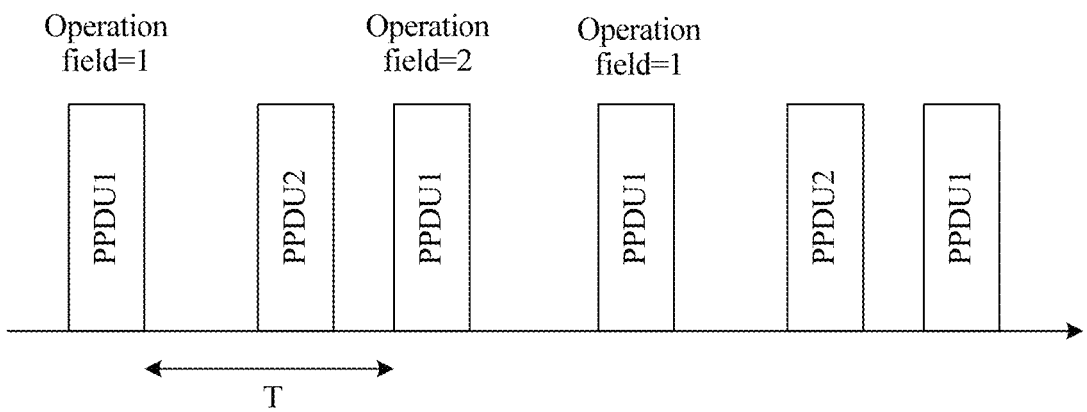
FIG. 26

DATA COMMUNICATION METHOD AND RELATED APPARATUS

CROSS-REFERENCE TO RELATED APPLICATIONS

This application is a continuation of U.S. patent application Ser. No. 15/468,593, filed Mar. 24, 2017, which is a continuation of International Patent Application No. PCT/CN2014/087403, filed on Sep. 25, 2014, All of the aforementioned patent applications are hereby incorporated by reference in their entireties.

TECHNICAL FIELD

The present invention relates to the field of data communication technologies, and in particular, to a data communication method and a related apparatus.

BACKGROUND

A wireless local area network (WLAN) technology based on IEEE 802.11 standards has been widely applied with development of technologies related to communications. Currently, a guard interval (GI) is introduced in various mainstream standards (such as 802.11n and 802.11ac) of WLAN to eliminate intercode interference brought by a delay spread of a channel. The terminal needs to select a proper guard interval length in a process in which a terminal communicates with an access device, so as to eliminate the intercode interference to a largest extent. A GI length used in the 802.11ac standard is 0.8 us. An AP and a STA use a preamble GI length of 0.8 us and a data GI length of 0.8 us in a process of data communication between the access device and the terminal.

The IEEE officially initiated a next-generation WLAN standard, that is, a high efficiency WLAN (HEW), in May, 2013, and the HEW standard is referred to as 802.11ax. HEW standardization work proposes providing more options in terms of a GI length, including GI lengths of 3.2 us, 2.4 us, 1.6 us, 1.2 us, 0.8 us, 0.4 us, and the like. There is currently no method for setting a GI length for data communication between a terminal and an access device in a HEW solution with multiple optional GI lengths.

SUMMARY

Embodiments provide a data communication method and a related apparatus, which can implement data communication between an access device and a terminal when the access device supports multiple data guard interval lengths.

A first aspect provides a data communication method, and the method may include:

constructing, by an access device, a beacon frame, where the beacon frame includes a newly added field, and the newly added field represents multiple data guard interval lengths supported by the access device; and broadcasting, by the access device, the beacon frame, so that a terminal selects an available guard interval length matching a data guard interval length supported by the terminal from the beacon frame, and performs data communication with the access device by using the available guard interval length.

Based on the first aspect, in a first feasible implementation manner, the beacon frame includes at least one element, a specific element in the at least one element carries the newly added field, and the specific element is an existing element or a newly added element.

Based on the first feasible implementation manner of the first aspect, in a second feasible implementation manner, the newly added field includes an indication index value corresponding to each preset bandwidth, and the indication index value represents a minimum data guard interval length in all data guard interval lengths supported by the access device in the preset bandwidth; or the newly added field includes an indicator bit of each preset data guard interval length, and the indicator bit is used to indicate whether the access device supports the preset data guard interval length; or the newly added field includes an indicator bit of each preset data guard interval length in each preset bandwidth, and the indicator bit is used to indicate whether the access device supports the preset data guard interval length in the preset bandwidth.

Based on the first aspect, in a third feasible implementation manner, after the constructing, by an access device, a beacon frame, the method further includes:

separately encapsulating, by the access device, the beacon frame into a first standard protocol data unit and a second standard protocol data unit; and the broadcasting, by the access device, the beacon frame includes:

broadcasting, by the access device, the beacon frame encapsulated into the first standard protocol data unit and the beacon frame encapsulated into the second standard protocol data unit.

Based on the third feasible implementation manner of the first aspect, in a fourth feasible implementation manner, the multiple data guard interval lengths supported by the access device include a data guard interval length supported by the access device in the first standard and a data guard interval length supported by the access device in the second standard; and the separately encapsulating, by the access device, the beacon frame into a first standard protocol data unit and a second standard protocol data unit includes:

obtaining, by the access device, a maximum data guard interval length in the data guard interval length supported by the access device in the first standard, and determining the maximum data guard interval length as a first alternative data guard interval length;

obtaining, by the access device, a maximum data guard interval length in the data guard interval length supported by the access device in the second standard, and determining the maximum data guard interval length as a second alternative data guard interval length; and separately encapsulating, by the access device, the beacon frame into the first standard protocol data unit and the second standard protocol data unit according to the first alternative data guard interval length and the second alternative data guard interval length.

Based on the fourth feasible implementation manner of the first aspect, in a fifth feasible implementation manner, the first standard protocol data unit includes a preamble and bearer data, the bearer data includes the beacon frame, and a guard interval length of the preamble and a guard interval length of the bearer data are the first alternative data guard interval length.

Based on the fourth feasible implementation manner of the first aspect, in a sixth feasible implementation manner, the second standard protocol data unit includes a legacy preamble, a high efficiency wireless local area network preamble, and bearer data, and a guard interval length of the legacy preamble, a guard interval length of the high efficiency wireless local area network preamble, and a guard interval length of the bearer data each are the second alternative data guard interval length; or the second standard protocol data unit includes a legacy preamble, a high efficiency wireless local area network preamble, and bearer data, a guard interval length of the legacy preamble is the first alternative data guard interval length, and a guard interval length of the high efficiency wireless local area network preamble and a guard interval length of the bearer data are the second alternative data guard interval length; or the second standard protocol data unit includes a high efficiency wireless local area network preamble and bearer data, and both a guard interval length of the high efficiency wireless local area network preamble and a guard interval length of the bearer data are the second alternative data guard interval length.

Based on the fourth feasible implementation manner of the first aspect, in a seventh feasible implementation manner, before the broadcasting, by the access device, the beacon frame encapsulated into the first standard protocol data unit and the beacon frame encapsulated into the second standard protocol data unit, the method further includes:

adding, by the access device, an operation field used to indicate a sending time of the second standard protocol data unit into the first standard protocol data unit; and the broadcasting, by the access device, the beacon frame encapsulated into the first standard protocol data unit and the beacon frame encapsulated into the second standard protocol data unit includes:

broadcasting, by the access device in a preset period, the first standard protocol data unit including the operation field; and broadcasting, by the access device, the second standard protocol data unit at the sending time indicated by the operation field.

A second aspect provides a data communication method, and the method may include:

obtaining, by a terminal, a beacon frame broadcast by an access device, where the beacon frame includes a newly added field, and the newly added field represents multiple data guard interval lengths supported by the access device;

selecting, by the terminal, an available guard interval length matching a data guard interval length supported by the terminal from the multiple data guard interval lengths supported by the access device; and performing, by the terminal, data communication with the access device by using the available guard interval length.

Based on the second aspect, in a first feasible implementation manner, the beacon frame is encapsulated into a first standard protocol data unit and a second standard protocol data unit, the access device sends the first standard protocol data unit in a preset period, and the first standard protocol data unit includes an operation field used to indicate a sending time of the second standard protocol data unit.

Based on the first feasible implementation manner of the second aspect, in a second feasible implementation manner, the obtaining, by a terminal, a beacon frame broadcast by an access device includes:

obtaining, by the terminal, the first standard protocol data unit broadcast by the access device, and parsing out the beacon frame from the first standard protocol data unit; or obtaining, by the terminal, the second standard protocol data unit broadcast by the access device, and parsing out the beacon frame from the second standard protocol data unit; or obtaining, by the terminal, the first standard protocol data unit broadcast by the access device, determining the sending time of the second standard protocol data unit from the operation field in the first standard protocol data unit, obtaining the second standard protocol data unit according to the sending time, and parsing out the beacon frame from the second standard protocol data unit.

A third aspect provides an access device, and the access device includes:

a construction module, configured to construct a beacon frame, where the beacon frame includes a newly added field, and the newly added field represents multiple data guard interval lengths supported by the access device; and a transceiver module, configured to broadcast the beacon frame and perform data communication with a terminal.

Based on the third aspect, in a first feasible implementation manner, the beacon frame includes at least one element, a specific element in the at least one element carries the newly added field, and the specific element is an existing element or a newly added element.

Based on the first feasible implementation manner of the third aspect, in a second feasible implementation manner, the newly added field includes an indication index value corresponding to each preset bandwidth, and the indication index value represents a minimum data guard interval length in all data guard interval lengths supported by the access device in the preset bandwidth; or the newly added field includes an indicator bit of each preset data guard interval length, and the indicator bit is used to indicate whether the access device supports the preset data guard interval length; or the newly added field includes an indicator bit of each preset data guard interval length in each preset bandwidth, and the indicator bit is used to indicate whether the access device supports the preset data guard interval length in the preset bandwidth.

Based on the third aspect, in a third possible implementation manner, the access device further includes:

an encapsulation module, configured to separately encapsulate the beacon frame into a first standard protocol data unit and a second standard protocol data unit; where the transceiver module is specifically configured to broadcast the beacon frame encapsulated into the first standard protocol data unit and the beacon frame encapsulated into the second standard protocol data unit.

Based on the third feasible implementation manner of the third aspect, in a fourth feasible implementation manner, the multiple data guard interval lengths supported by the access device include a data guard interval length supported by the access device in the first standard and a data guard interval length supported by the access device in the second standard; and the encapsulation module includes:

a first obtaining unit, configured to obtain a maximum data guard interval length in the data guard interval length supported by the access device in the first standard, and determine the maximum data guard interval length as a first alternative data guard interval length;

a second obtaining unit, configured to obtain a maximum data guard interval length in the data guard interval length supported by the access device in the second standard, and determine the maximum data guard interval length as a second alternative data guard interval length; and an encapsulation unit, configured to separately encapsulate the beacon frame into the first standard protocol data unit and the second standard protocol data unit according to the first alternative data guard interval length and the second alternative data guard interval length.

Based on the fourth feasible implementation manner of the third aspect, in a fifth feasible implementation manner, the first standard protocol data unit includes a preamble and bearer data, the bearer data includes the beacon frame, and a guard interval length of the preamble and a guard interval length of the bearer data are the first alternative data guard interval length.

Based on the fourth feasible implementation manner of the third aspect, in a sixth feasible implementation manner, the second standard protocol data unit includes a legacy preamble, a high efficiency wireless local area network preamble, and bearer data, and a guard interval length of the legacy preamble, a guard interval length of the high efficiency wireless local area network preamble, and a guard interval length of the bearer data each are the second alternative data guard interval length; or the second standard protocol data unit includes a legacy preamble, a high efficiency wireless local area network preamble, and bearer data, a guard interval length of the legacy preamble is the first alternative data guard interval length, and a guard interval length of the high efficiency wireless local area network preamble and a guard interval length of the bearer data are the second alternative data guard interval length; or the second standard protocol data unit includes a high efficiency wireless local area network preamble and bearer data, and both a guard interval length of the high efficiency wireless local area network preamble and a guard interval length of the bearer data are the second alternative data guard interval length.

Based on the fourth feasible implementation manners of the third aspect, in a seventh feasible implementation manner, the access device further includes:

a processing module, configured to add an operation field used to indicate a sending time of the second standard protocol data unit into the first standard protocol data unit; where the transceiver module is specifically configured to broadcast, in a preset period, the first standard protocol data unit including the operation field, and the transceiver module is further configured to broadcast the second standard protocol data unit at the sending time indicated by the operation field.

A fourth aspect provides a terminal, where the terminal includes:

a transceiver module, configured to obtain a beacon frame broadcast by an access device, where the beacon frame includes a newly added field, and the newly added field represents multiple data guard interval lengths supported by the access device; and a selection module, configured to select an available guard interval length matching a data guard interval length supported by the terminal from the multiple data guard interval lengths supported by the access device; where the transceiver module is further configured to perform data communication with the access device by using the available guard interval length.

Based on the fourth aspect, in a first feasible implementation manner, the beacon frame is encapsulated into a first standard protocol data unit and a second standard protocol data unit, the access device sends the first standard protocol data unit in a preset period, and the first standard protocol data unit includes an operation field used to indicate a sending time of the second standard protocol data unit.

Based on the first feasible implementation manner of the fourth aspect, in a second feasible implementation manner, the transceiver module is specifically configured to obtain the first standard protocol data unit broadcast by the access device, and parse out the beacon frame from the first standard protocol data unit; or the transceiver module is specifically configured to obtain the second standard protocol data unit broadcast by the access device, and parse out the beacon frame from the second standard protocol data unit; or the transceiver module is specifically configured to obtain the first standard protocol data unit broadcast by the access device, determine the sending time of the second standard protocol data unit from the operation field in the first standard protocol data unit, obtain the second standard protocol data unit according to the sending time, and parse out the beacon frame from the second standard protocol data unit.

In the embodiments, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

BRIEF DESCRIPTION OF DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

FIG. 1 is a diagram of an application scenario of a data communication method according to the present invention;

FIG. 2 is a schematic flowchart of a data communication method according to the present invention;

FIG. 5 is a schematic flowchart of still another data communication method according to the present invention;

FIG. 6 is a schematic structural diagram of a newly added element according to the present invention;

FIG. 7 is a schematic structural diagram of another newly added element according to the present invention;

FIG. 8 is a table of data GI lengths supported by an AP in a HEW standard;

FIG. 9 is another table of data GI lengths supported by an AP in a HEW standard;

FIG. 10 is an indication index value correspondence table according to the present invention;

FIG. 12 is a table for explaining and describing a newly added field according to the present invention;

FIG. 14 is another table for explaining and describing a newly added field according to the present invention;

FIG. 15 is still another table of data GI lengths supported by an AP in a HEW standard;

FIG. 16 is a schematic structural diagram of still another newly added field according to the present invention;

FIG. 17A and FIG. 17B are a still another table for explaining and describing a newly added field according to the present invention;

FIG. 24 is a still another table for explaining and describing each field in a PPDU2 according to the present invention;

FIG. 25 is a broadcasting manner of a PPDU1 and a PPDU2 according to the present invention;

FIG. 26 is another broadcasting manner of a PPDU1 and a PPDU2 according to the present invention;

DESCRIPTION OF EMBODIMENTS

Figure 3:
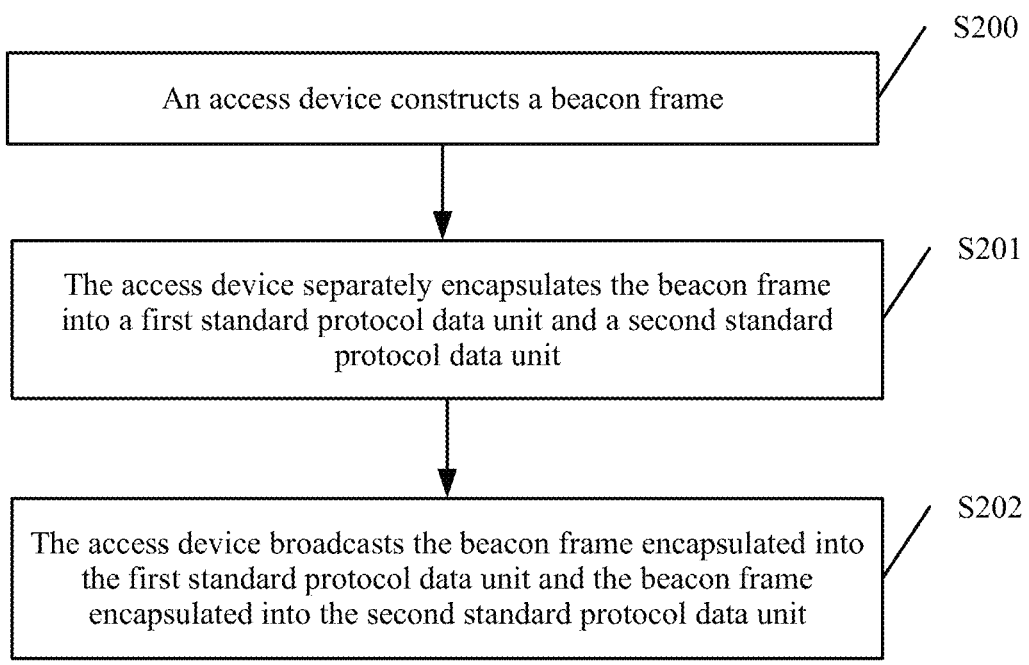
FIG. 3 is a schematic flowchart of another data communication method according to the present invention.

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

An access device may be an access point (AP), which is also referred to as a wireless access point, a hotspot, or the like. The AP is an access point through which a mobile user enters a wired network, and the AP is mainly deployed at home or within a building and a park with a typical coverage radius of tens to hundreds of meters, but certainly may also be deployed outdoors. The AP is equivalent to a bridge connecting a wired network and a wireless network. A major function of the AP is to connect all wireless network clients together, and then connect the wireless network to the Ethernet. Currently, a standard mainly used by the AP is an IEEE (Institute of Electrical and Electronics Engineers) 802.11 family. Specifically, the AP may be a terminal device or a network device with a WiFi chip. Optionally, the AP may be a device supporting the 802.11ax standard, and further optionally, the AP may be a device supporting multiple WLAN (Wireless Local Area Network) standards, such as 802.11ac, 802.11n, 802.11g, 802.11b, and 802.11a.

A terminal may be a wireless communication chip, a wireless sensor, or a wireless communication terminal. For example, the terminal may be a mobile phone supporting a wireless fidelity (WiFi) communication function, a tablet computer supporting a WiFi communication function, a set top box supporting a WiFi communication function, and a computer supporting a WiFi communication function. Optionally, the terminal may support the 802.11ax standard, and further optionally, the terminal supports the multiple WLAN standards, such as 802.11ac, 802.11n, 802.11g, 802.11b, and 802.11a.

In the prior art, for example, in the 802.11ac standard, a data GI length used in a process of data communication between an AP and a STA is 0.8 us. A HEW standard proposes more options in terms of a data GI length, including data GI lengths of 0.4 us, 0.8 us, 1.2 us, 1.6 us, 2.4 us, 3.2 us, and the like. Therefore, the fixed data GI length in the prior art cannot satisfy data communication between an AP and a STA in the new HEW standard. As shown in FIG. 1, when the AP supports a STA2 and a STA3 of the HEW standard, and a STA1 of the 802.11ac standard, and a data GI length of 0.8 us is used between the AP and the STA, because the STA1 and the STA2 fall within a coverage area of 0.8 us, the STA1 and the STA2 can perform data communication with the AP. However, the STA3 falls beyond the coverage area of 0.8 us, and therefore cannot perform data communication with the AP.

The embodiments may be applied to an application scenario in FIG. 1. An AP broadcasts a beacon frame to all STAs, where the beacon frame carries a newly added field, and the newly added field is used to represent multiple data GI lengths supported by the AP, so that when receiving the beacon frame broadcast by the AP, a terminal parses out the multiple data GI lengths supported by the AP and selects a data GI length matching a data GI length supported by the terminal as a data GI length used in data communication between the terminal and the AP. Therefore, in the embodiments, data communication between the AP and the STA can be successfully implemented in a case of multiple data GI lengths proposed by the HEW standard.

Referring to FIG. 2, FIG. 2 is a data communication method according to an embodiment. As shown in FIG. 2, the data communication method in this embodiment includes steps S100-S101.

S100. An access device constructs a beacon frame, where the beacon frame includes a newly added field, and the newly added field represents multiple data guard interval lengths supported by the access device.

In a specific embodiment, data GI lengths supported by a new-generation standard solution HEW being currently studied by a standardization group are {0.4 us, 0.8 us, 1.6 us, 2.4 us, 3.2 us}, and the access device may be a wireless access point (AP). In the present invention, in order that the AP better indicates data GI length information, the newly added field is added into the beacon frame, denoted as an "HE supports GI" field, and the newly added field is used to represent the multiple GI lengths supported by the AP. The "HE supports GI" field is used to exchange data GI lengths respectively supported by the AP and a STA between the AP and the STA. The following provides detailed descriptions separately in aspects such as a location of the "HE supports GI" field and a format of the "HE supports GI" field.

The "HE supports GI" field may be placed in any location in the beacon frame. For example, the field may be placed in an existing element of the beacon frame, or may be placed in a newly added element created in the beacon frame. In addition, the field may also be placed in a SIG field of a presentation protocol data unit (PPDU) frame of a physical layer carrying the beacon frame. The following considers a case of creating the newly added element to place the "HE supports GI" field. The newly created element is denoted as an HE capability element. In this case, the "HE supports GI" field may be placed in the following manner.

In a first optional implementation manner, the "HE supports GI" field is directly placed in the "HE capability" element, and an "HE capability" information element includes a field used for describing an optional capability of an AP supporting a WLAN solution. The "HE supports GI" field is placed in the "HE capability" element, for example, may be placed in a manner shown in FIG. 6.

In a second optional implementation manner, the "HE supports GI" field is placed in a field of the "HE capability" element. As shown in FIG. 7, the "HE capability" element includes an "HE capability information" field, and the field is used to indicate capability information of the AP. The "HE supports GI" field may be placed in the foregoing "HE capability information" field.

In the present invention, the newly added field, that is, the "HE supports GI" field, indicates a data GI length supported by the AP, and in the new-generation standard HEW solution, a bandwidth supported by the AP may be 20 MHz, 40 MHz, 80 MHz, or 160 MHz. As shown in FIG. 8, there are multiple GI lengths in different bandwidths. The data GI length supported by the AP is a length of N (N= 1, 2, 3, . . . , 32) times 0.4 us. The "HE supports GI" field may be represented in multiple manners. The following separately uses several representation manners as examples for description, and it should be noted that a specific representation manner is not limited herein.

In a first optional implementation manner, the newly added field includes an indication index value corresponding to each preset bandwidth, where the indication index value represents a minimum data guard interval length in all data guard interval lengths supported by the access device in the preset bandwidth, and the preset bandwidth may include 20 MHz, 40 MHz, 80 MHz, and 160 MHz. For ease of description, a specific representation manner may be: randomly selecting M data GI lengths from all the data GI lengths supported by the different bandwidths shown in a table in FIG. 8, as the GI length supported by the AP, which is shown in FIG. 9. N represents a serial number, a value of N is {1, 2, . . . , M}, m represents a bit quantity of an indicator bit, and N is in a one-to-one correspondence with a value of the indicator bit. Assuming that six data GI lengths are selected, that is, M=6, N={1, 2, . . . , 6}, m=3, and a relationship between N and the indicator bit is shown in FIG. 9. For ease of description, assuming that the AP does not support some data GI lengths, "-" indicates that the AP in a corresponding bandwidth does not support the GI length.

Assuming that the minimum data GI length supported by the AP is denoted as a min_GI, an index value corresponding to the min_GI is N, and each of the different bandwidths is corresponding to one min_GI. The min_GI that is supported by the AP in the different bandwidths and that is obtained according to FIG. 9, and a relationship between the min_GI and the serial number and the indicator bit are shown in FIG. 10.

Figure 11:
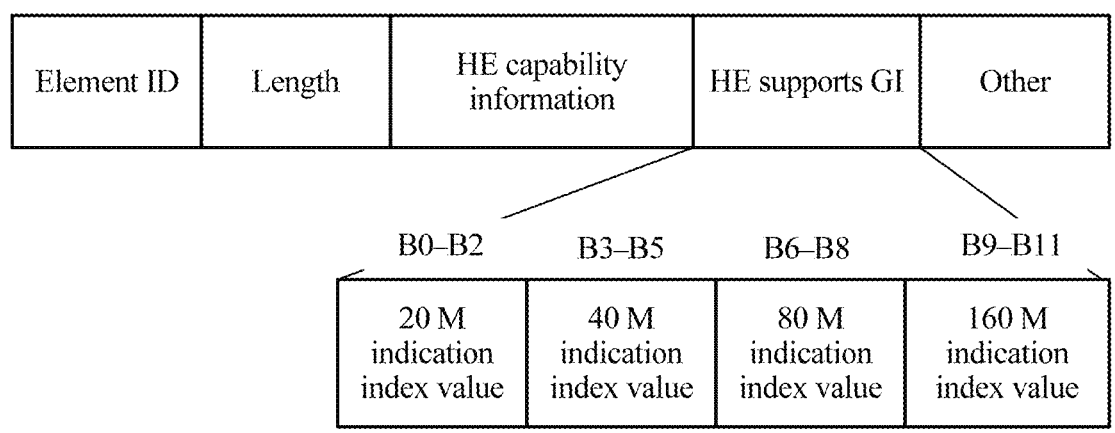
FIG. 11 is a schematic structural diagram of a newly added field according to the present invention.

The indication index value included by the "HE supports GI" field refers to an index value corresponding to a min_GI, indicated by the "HE supports GI" field, in different bandwidths. The index value corresponding to the min_GI, indicated by the "HE supports GI" field, in the different bandwidths refers to a serial number corresponding to a min_GI that is supported by the AP in each bandwidth and that is carried by the "HE supports GI" field. For example, data GI lengths supported in a bandwidth of 20 MHz are {0.8 us, 1.2 us, 1.6 us, 2.0 us, 2.4 us, 2.8 us, 3.2 us}. Assuming that a min_GI supported in the bandwidth of 20 MHz is 0.8 us, an indication index value of a serial number of 20 MHz is 2. For processing of 40 MHz, 80 MHz, and 160 MHz, refers to processing of 20 MHz. Specifically, the indication index value of the "HE supports GI" field in the beacon frame is represented in a binary-encoded form, that is, in a form of an indicator bit, and a specific representation form is shown in FIG. 11, where the "HE supports GI" field includes an indication index value in each preset bandwidth, and the indication index value GI_Idx is represented by bit information. Specific bit information representation is shown in FIG. 12.

In a second optional implementation manner, the newly added field includes an indicator bit of each preset data guard interval length, and the indicator bit is used to indicate whether the access device supports the preset data guard interval length. This implementation manner does not consider an effect of a bandwidth, and M data GI lengths are selected from data GI lengths shown in FIG. 8 as the preset data GI length. For example, the preset data GI lengths are {0.4 us, 0.8 us, 1.2 us, 1.6 us, 2.0 us, 2.4 us, 2.8 us, 3.2 us}.

Figure 13:
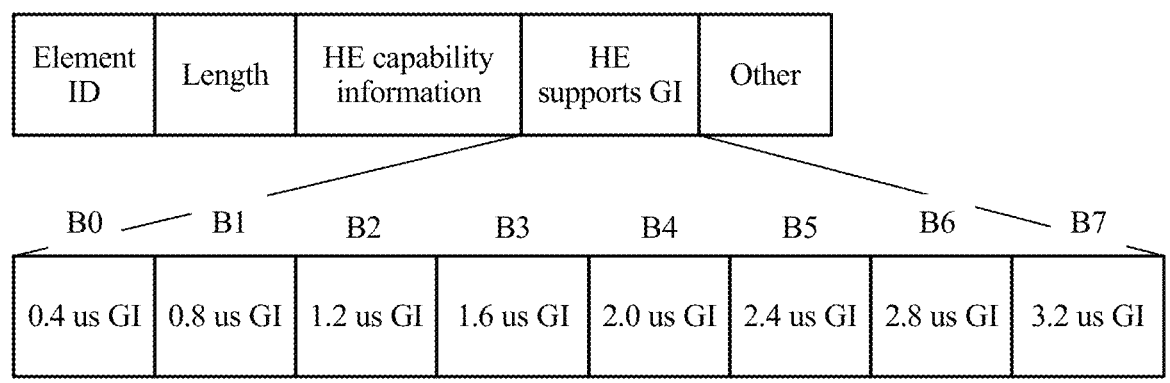
FIG. 13 is a schematic structural diagram of another newly added field according to the present invention.

The "HE supports GI" field uses the indicator bit to indicate whether the AP supports the preset data GI length. The "HE supports GI" field may use a single-bit indicator bit to indicate each data GI length in all preset data GI lengths, where each bit information bit indicates one data GI length. A representation manner of the "HE supports GI" field is shown in FIG. 13, where one bit indicates one data GI length. A specific bit information indication is shown in FIG. 14.

In a third optional implementation manner, the newly added field includes an indicator bit of each preset data guard interval length in each preset bandwidth, and the indicator bit is used to indicate whether the access device supports the preset data guard interval length in the preset bandwidth. In this embodiment, as shown in FIG. 15, M data GI lengths are randomly selected from all the data GI lengths shown in FIG. 8 and supported in different bandwidths, as the data GI length supported by the AP, where M=5 herein. That the "HE supports GI" field indicates a data GI length supported in each bandwidth refers to that the "HE supports GI" field uses a single-bit indicator bit to indicate the data GI length supported by the AP, that is, each bit separately indicates a data GI length supported in different bandwidths, and a representation form of the "HE supports GI" field is shown in FIG. 16. Specific bit information is shown in FIG. 17A and FIG. 17B.

S101. The access device broadcasts the beacon frame, so that a terminal selects an available guard interval length matching a data guard interval length supported by the terminal from the beacon frame, and performs data communication with the access device by using the available guard interval length.

In a specific embodiment, the access device broadcasts the constructed beacon frame, and a specific broadcasting manner may be encapsulating the beacon frame into a PPDU format for broadcasting. There may be multiple PPDU format encapsulation manners. For example, the beacon frame may be encapsulated into a PPDU1 according to an 802.11ac in an existing standard; or another encapsulation manner may be created according to the new-generation standard HEW, to encapsulate the beacon frame into a PPDU2, so that a terminal supporting the new-generation standard HEW can identify and parse the PPDU2, where for a specific creation manner, refer to a description of FIG. 3.

When a terminal STA1 supporting the 802.11ac standard and a terminal STA2 supporting the new-generation standard HEW coexist within a broadcasting range, the access device AP needs to broadcast the encapsulated PPDU1 and PPDU2, so that both the STA1 and the STA2 can access a network. A broadcasting manner of the PPDU1 may be broadcasting the PPDU1 in a specific preset period according to an existing standard. For broadcasting of the PPDU2, an operation field may be added into the PPDU1, where the operation field indicates a broadcasting time of the PPDU2, so that the PPDU2 is broadcast at the time indicated by the operation field.

After receiving the beacon frame broadcast by the AP and encapsulated into a PPDU1 format, the STA1 accesses the network according to the existing 802.11ac standard. After detecting the PPDU1 and/or the PPDU2, the STA2 parses out the beacon frame and analyzes each capability element of the beacon frame, and parses the "HE supports GI" field in the capability element to obtain a data GI length supported by the AP. The STA2 obtains, according to a data GI length supported by the STA2, an available data GI length used in communication with the AP, where the available data GI length refers to a data GI length that matches the data GI length supported by the STA2 and that is in the data GI length supported by the AP. For example, the data GI lengths supported by the STA2 are {0.8 us, 1.6 us, 2.4 us, 3.2 us}, and the data GI lengths supported by the AP are {0.4 us, 0.8 us, 1.6 us, 2.0 us, 2.4 us, 3.2 us}. It can be learned that data GI lengths supported by both the AP and the STA2 are {0.8 us, 1.6 us, 2.4 us, 3.2 us}, and in this case, {0.8 us, 1.6 us, 2.4 us, 3.2 us} are the available data GI length. Subsequently, the STA2 performs data communication with the AP by using an optional data GI length, and specifically, the STA2 may select, according to a channel condition, a data GI length from the available GI length to perform data communication with the AP.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Referring to FIG. 3, FIG. 3 is another data communication method according to an embodiment. As shown in FIG. 3, the data communication method in this embodiment includes steps S200-S202.

S200. An access device constructs a beacon frame, where the beacon frame includes a newly added field, and the newly added field represents multiple data guard interval lengths supported by the access device.

S201. The access device separately encapsulates the beacon frame into a first standard protocol data unit and a second standard protocol data unit.

In a specific embodiment, a case in which a STA supporting the first standard and a STA supporting the second standard coexist in a network is considered. For example, a STA1 supports the first standard, and a STA2 supports the second standard. The foregoing first standard or second standard is a different WIFI solution, which may be an existing WIFI standard solution such as an 802.11ac, or may be a new-generation standard solution HEW being currently studied by the standardization group, or may be another similar WIFI solution.

When encapsulating the beacon frame into a PPDU format, the access device AP needs to encapsulate the beacon frame into two PPDU formats, which are respectively the first standard protocol data unit PPDU1 and the second standard protocol data unit PPDU2, where the PPDU1 is obtained by means of encapsulation according to the first standard, and the PPDU2 is obtained by means of encapsulation according to the second standard. The following describes a specific encapsulation manner in detail, which specifically includes steps S20-S22.

S20. The access device obtains a maximum data guard interval length in a data guard interval length supported by the access device in the first standard, and determines the maximum data guard interval length as a first alternative data guard interval length.

In a specific embodiment, the AP separately supports a set of data GI lengths in the first standard and the second standard. The first alternative data GI length refers to a maximum data GI length in a set of GIs supported by the AP in the first standard. For example, assuming that the data GI lengths supported by the AP in the first standard are {0.4 us, 0.8 us}, the first alternative data GI length refers to a data GI length of 0.8 us.

S21. The access device obtains a maximum data guard interval length in a data guard interval length supported by the access device in the second standard, and determines the maximum data guard interval length as a second alternative data guard interval length.

In a specific embodiment, the AP also supports a set of data GI lengths in the second standard, and the second alternative data guard interval length refers to a maximum data GI length in a set of GIs supported by the AP in the second standard. For example, assuming that the set of data GI lengths supported by the AP in the second standard is {0.4 us, 0.8 us, 1.6 us, 2.4 us, 3.2 us}, the second alternative data GI length refers to a data GI length of 3.2 us.

It should be noted that in a case in which STAs supporting different standards in a network are more diverse, that is, multiple types of STAs exist, different types of STAs support different standards, but compatibility may exist between the STAs supporting the different standards. However, the STAs can only be forward compatible instead of backward compatible. For example, a STA supporting the HEW can be compatible with a STA supporting the 802.11ac standard, but the STA supporting the 802.11ac standard cannot be compatible with the STA supporting the HEW. When the multiple types of STAs exist in the network, for example, a quantity of different standards supported by the diverse STAs in the network is 3, 4, or more, the alternative data GI lengths may be correspondingly determined, and in this case, a quantity of the alternative data GI lengths is correspondingly 3, 4, or more. For ease of description, the following describes content by assuming that two STAs existing in the network support the first standard (such as the 802.11ac standard solution) and the second standard (such as a current HEW standard solution), respectively, and the alternative data GI lengths are denoted as GI1 and GI2.

S22. The access device separately encapsulates the beacon frame into the first standard protocol data unit and the second standard protocol data unit according to the first alternative data guard interval length and the second alternative data guard interval length.

In a specific embodiment, the access device encapsulates the beacon frame into the first standard protocol data unit PPDU1 and the second standard protocol data unit PPDU2 according to the first alternative data guard interval length GI1 and the second alternative data guard interval length GI2, and the constructed PPDU1 and PPDU2 need to comply with PPDU formats in respective standards. The following separately describes formats of the PPDU1 and the PPDU2.

Figure 18:
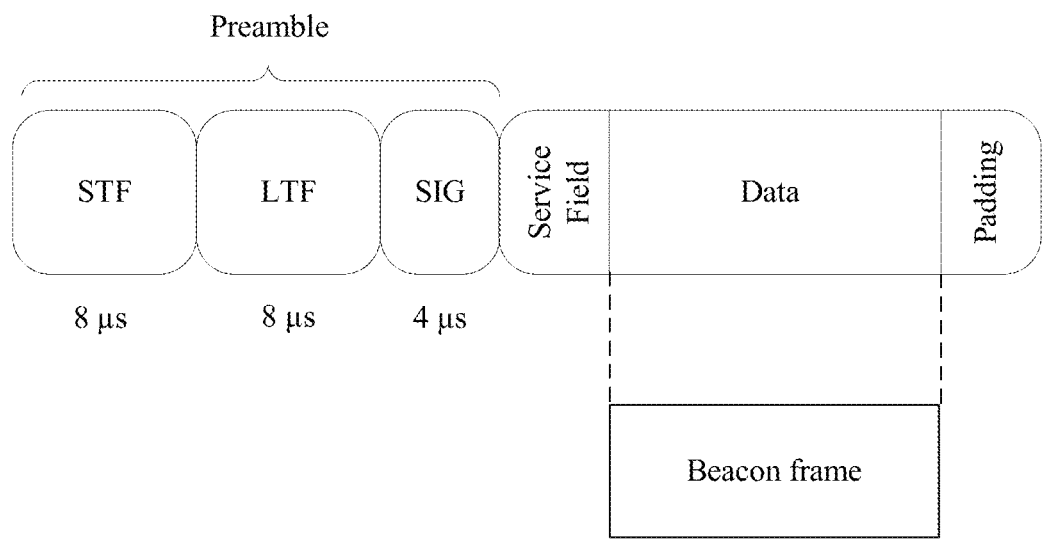
FIG. 18 is an encapsulation format of a PPDU1 in the 802.11ac standard.

Optionally, as shown in FIG. 18, the PPDU1 format includes a preamble and bearer data, the bearer data includes the beacon frame, and a preamble GI length and a data GI length in the PPDU1 format each are GI1. A purpose of sending the PPDU1 by the AP is to enable the STA1 supporting the first standard to detect the network. The first standard may be the 802.11ac standard.

Optionally, the second standard may be the HEW standard. With reference to the HEW standard, the PPDU2 format has multiple designing methods, which are not limited herein. The following lists three optional PPDU2 format designs.

Figure 19:
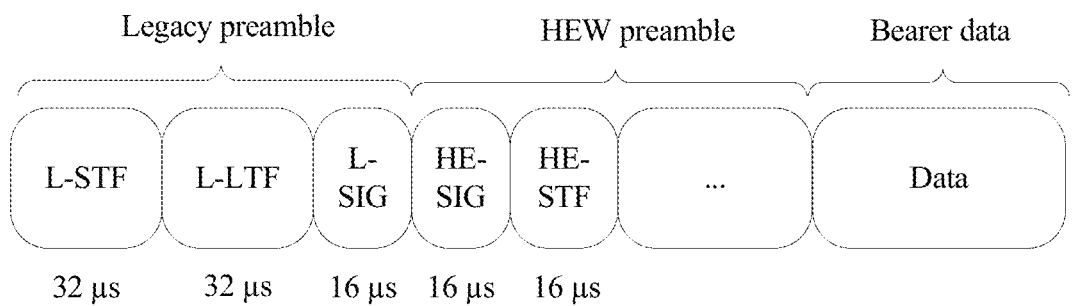
FIG. 19 is an encapsulation format of a PPDU2 according to the present invention.

In a first optional implementation manner, as shown in FIG. 19, the PPDU2 includes a legacy preamble, a high efficiency wireless local area network preamble, and bearer data, where a combination of an L-STF, an L-LTF, and an L-SIG is referred to as the legacy preamble, and a combination of an HE-SIG, an HE-STF, and another possible field is referred to as the HEW preamble. A GI length of the legacy preamble, a GI length of the HEW preamble, and a GI length of the bearer data each are GI2. A purpose of sending the PPDU2 by the AP is to enable the STA2 supporting the second standard to detect the network. It should be noted that the STA2 can also detect the PPDU1 and process the PPDU1. Description of all fields in FIG. 19 is shown in FIG. 20.

Figures 20, 21:
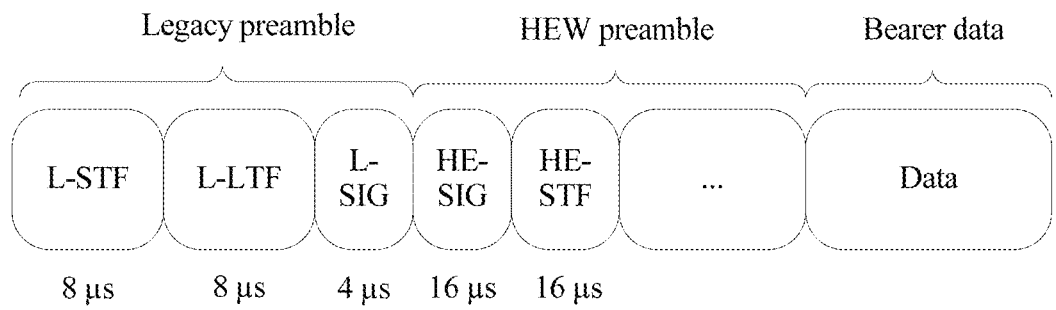
FIG. 20 is a table for explaining and describing each field in a PPDU2 according to the present invention.
FIG. 21 is another encapsulation format of a PPDU2 according to the present invention.

In a second optional implementation manner, as shown in FIG. 21, the PPDU2 format includes a legacy preamble, a high efficiency wireless local area network preamble, and bearer data, where a GI length of the legacy preamble is GI1, and a GI length of the HEW preamble and a GI length of the bearer data each are GI2. A purpose of sending the PPDU2 by the AP is to enable the STA2 supporting the second standard to detect the network. The length, obtained from FIG. 20, of the legacy preamble in the PPDU2 format in the first optional implementation manner is 80 us. The length, obtained from FIG. 22, of the legacy preamble in the PPDU2 format in the second optional implementation manner is 20 us. In a case in which lengths of remaining fields are the same, transmission overheads are reduced by 60 us in the second optional implementation manner. Description of all fields in FIG. 21 is shown in FIG. 22.

Figures 22, 23:
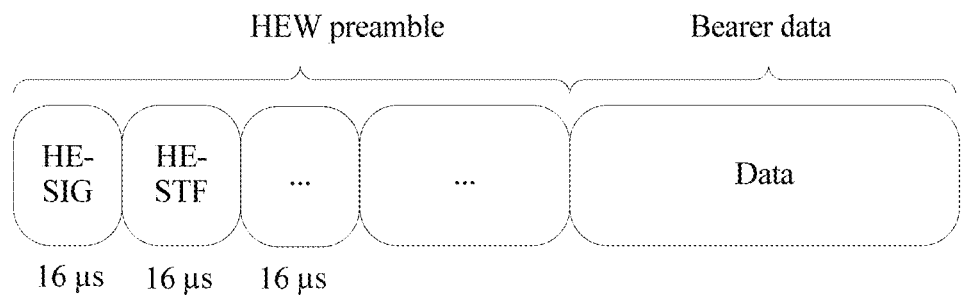
FIG. 22 is another table for explaining and describing each field in a PPDU2 according to the present invention.
FIG. 23 is an encapsulation format of still another PPDU2 according to the present invention.

In a third optional implementation manner, the PPDU2 format is shown in FIG. 23, and the PPDU2 includes a high efficiency wireless local area network preamble and bearer data. Description of all fields in FIG. 23 is shown in FIG. 24. A GI length of the HEW preamble and a GI length of the bearer data each are GI2, and a purpose of sending the PPDU2 by the AP is to enable the STA2 supporting the second standard to detect the network. Compared with the PPDU format in the first optional implementation manner, the PPDU format in the third optional implementation manner removes a legacy preamble. Therefore, in a case in which lengths of remaining fields are the same, transmission overheads are reduced by 80 us compared with the PPDU format in the first optional implementation manner.

S202. The access device broadcasts the beacon frame encapsulated into the first standard protocol data unit and the beacon frame encapsulated into the second standard protocol data unit.

In a specific embodiment, the access device broadcasts the beacon frame encapsulated into the PPDU1 and the beacon frame encapsulated into the PPDU2, and a specific broadcasting manner may be broadcasting the PPDU1 in a preset period and broadcasting the PPDU2 at a specified broadcasting time. However, an operation field needs to be added into the PPDU1, and a sending time of the PPDU2 is indicated.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 4:
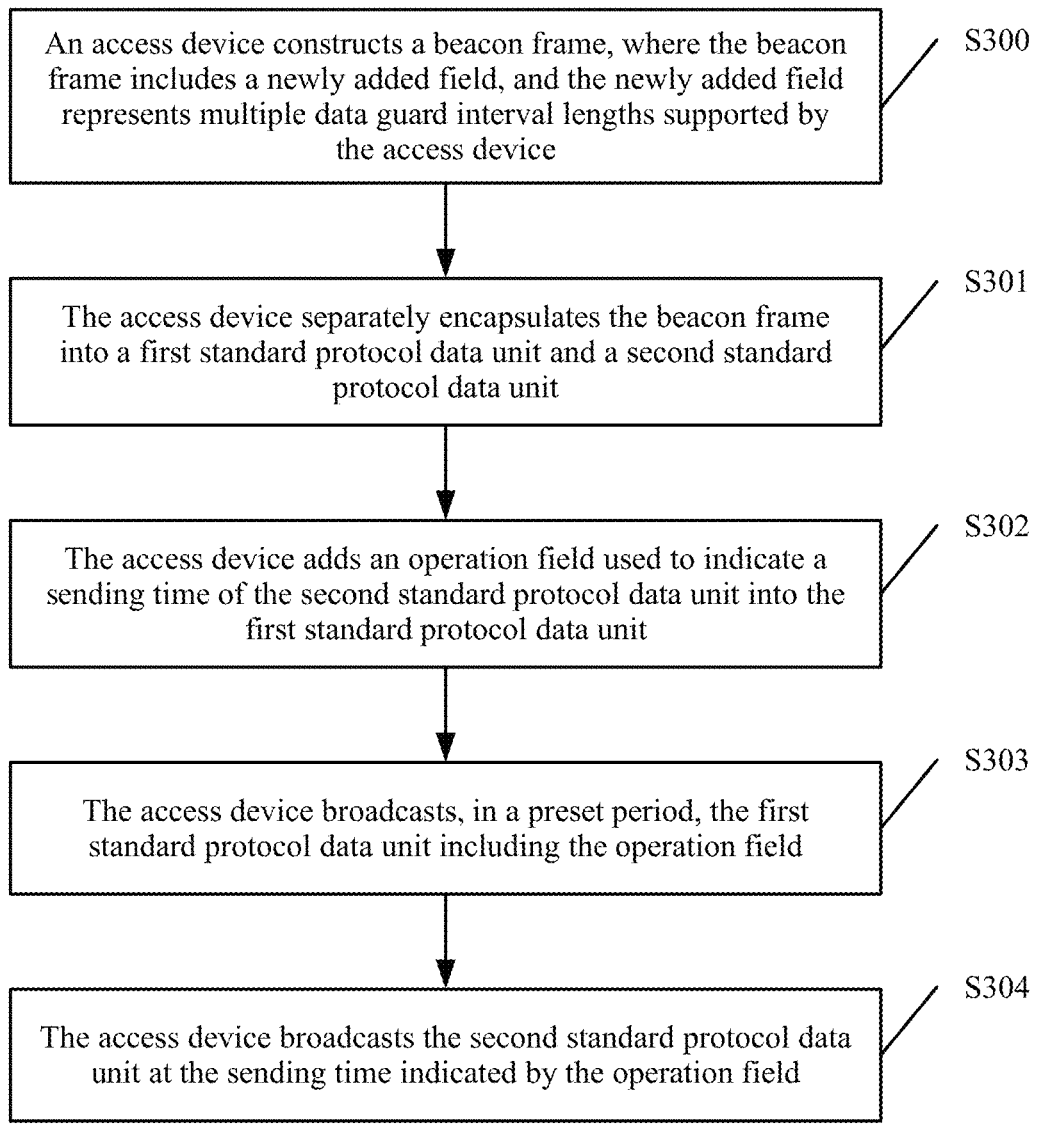
FIG. 4 is a schematic flowchart of still another data communication method according to the present invention.

Referring to FIG. 4, FIG. 4 is another data communication method according to an embodiment. As shown in FIG. 4, the data communication method in this embodiment includes steps S300-S304.

S300. An access device constructs a beacon frame, where the beacon frame includes a newly added field, and the newly added field represents multiple data guard interval lengths supported by the access device.

S301. The access device separately encapsulates the beacon frame into a first standard protocol data unit and a second standard protocol data unit.

S302. The access device adds an operation field used to indicate a sending time of the second standard protocol data unit into the first standard protocol data unit.

In a specific embodiment, the AP sends a constructed PPDU1 and PPDU2. Assuming that the PPDU1 is constructed according to the 802.11ac standard, a sending period that is of the PPDU1 and is specified in the 802.11ac standard is T1, and a time for sending the PPDU2 by the AP may be randomly specified, for example, the AP alternately sends the PPDU1 and the PPDU2. An operation field may be added into the PPDU1 for indication, and an operation field may also be added into the PPDU2 for indication. The operation field is used to indicate the sending time of the PPDU2. The operation field may indicate the sending time of the PPDU2 in multiple indication manners, and the following lists only two manners.

In a first optional implementation manner, an HE operation field uses only one bit to indicate whether a next m*T (for example, m=⅔) period has the PPDU2, where T is a preset period of broadcasting the PPDU1. That is, if a value of the HE operation field is 1, it indicates that the next m*T period has the PPDU2; or if a value of the HE operation field is 0, it indicates that the next m*T period has no PPDU2. As shown in FIG. 25, a value of an HE operation field in a first PPDU1 from the left is 1, so that it indicates that the next m*T period has the PPDU2; and a value of an HE operation field in a second PPDU1 is 0, so that the next m*T period has no PPDU2.

In a second optional implementation manner, the HE operation field has two or more bits, denoted as x bits. The HE operation field may be used to indicate whether a next (n+m*T) (for example, m=⅔, and n is a natural number indicated by the x bits) period has the PPDU2. That is, if the value of the HE operation field is n, it indicates that the next (n+m*T) period has the PPDU2. As shown in FIG. 26, a value of an HE operation field in a first PPDU1 from the left is 1, so that it indicates that the next m*T period has the PPDU2; and a value of an HE operation field in a second PPDU1 is 2, so that next two m*T periods have the PPDU2.

S303. The access device broadcasts, in a preset period, the first standard protocol data unit including the operation field.

In a specific embodiment, the access device broadcasts, in a specific preset period, a PPDU1 including an operation field. The PPDU1 may be encapsulated according to the 802.11ac standard, and therefore the PPDU1 may be broadcast according to a preset period in the 802.11ac standard.

S304. The access device broadcasts the second standard protocol data unit at the sending time indicated by the operation field.

In a specific embodiment, as shown in FIG. 25 or FIG. 26, the access device broadcasts the PPDU2 at the sending time indicated by the operation field. When receiving the PPDU1, the terminal may learn the sending time of the PPPDU2 according to the operation field, and receive the PPDU2 at the learned sending time.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Referring to FIG. 5, FIG. 5 is another data communication method according to an embodiment. As shown in FIG. 5, the data communication method in this embodiment includes steps S400-S402.

S400. A terminal obtains a beacon frame broadcast by an access device, where the beacon frame includes a newly added field, and the newly added field represents multiple data guard interval lengths supported by the access device.

In a specific embodiment, the terminal STA obtains the beacon frame broadcast by the access device, where the beacon frame may be a beacon frame, the beacon frame includes the newly added field, and the newly added field represents the multiple data GI lengths supported by the access device. A processing procedure of the STA is corresponding to the foregoing processing procedure of the access device AP. An AP side encapsulates the beacon frame into a first standard protocol data unit PPDU1 and a second standard protocol data unit PPDU2, where the first standard may be an 802.11ac standard, and the second standard may be a HEW standard. In this embodiment, when a STA1 supporting the first standard and a STA2 supporting the second standard exist in a network, the STA1 can perform normal detection processing only on the PPDU1. For a detection processing method, refer to the 802.11ac standard solution, which is not described in detail herein. The STA processing procedure described herein refers to the foregoing processing procedure of the STA2.

The AP sends the PPDU1 in a preset period, where the PPDU1 includes an operation field used to indicate a sending time of the PPDU2, and the operation field indicates the sending time of the PPDU2. Specifically, a method used by the STA to obtain the beacon frame broadcast by the AP may have three optional implementation manners:

In a first optional implementation manner, if the STA obtains the PPDU1 broadcast by the AP, the STA processes the PPDU1 and parses out the beacon frame from the PPDU1, and at the same time, the STA determines a preamble length in subsequent data communication between the STA and the AP according to a preamble of the PPDU1. For example, if the preamble of the PPDU1 is GI1, the STA sets the preamble in the subsequent data communication to GI1.

In a second optional implementation manner, if the STA obtains the PPDU2 broadcast by the AP, the STA processes the PPDU2 and parses out the beacon frame from the PPDU2, and at the same time, the STA determines a preamble length in subsequent data communication between the STA and the AP according to a preamble of the PPDU2. For example, if the preamble of the PPDU2 is GI2, the STA sets the preamble in the subsequent data communication to GI2.

In a third optional implementation manner, if the STA receives the PPDU1, the STA obtains a sending time of a next PPDU2 from the PPDU1 by parsing the "HE operation" field. For example, assuming that the "HE operation" uses a bit to indicate whether a next period has the PPDU2, if the "HE operation" field indicates 0, it indicates that the STA needs to detect the PPDU2 in the next period; or if the "HE operation" field indicates 1, it indicates that the STA does not need to detect the PPDU2 in the next period. The STA parses out the beacon frame from the detected PPDU2. In addition, the STA determines a preamble length in subsequent data communication between the STA and the AP according to the preamble of the PPDU2. For example, if the preamble of the PPDU2 is GI2, the STA sets the preamble in the subsequent data communication to GI2.

S401. The terminal selects an available guard interval length matching a data guard interval length supported by the terminal from the multiple data guard interval lengths supported by the access device.

In a specific embodiment, the terminal STA analyzes the beacon frame after obtaining the beacon frame. A specific analysis manner may be: the STA detects all capability elements of the beacon frame and obtains a data GI length supported by the AP by parsing an "HE supports GI" field; and the STA sets the available GI length according to the data GI length supported by the STA and the obtained data GI length supported by the AP. For example, assuming that data GI lengths indicated by information about the "HE supports GI" field are {0.8 us, 1.6 us, 2.4 us}, data GI lengths supported by the AP are {0.8 us, 1.6 us, 2.4 us}. GI lengths supported by the STA itself are {0.4 us, 0.8 us, 1.6 us, 2.4 us, 3.2 us}. It can be learned that data GI lengths supported by both the AP and the STA2 are {0.8 us, 1.6 us}, and in this case, {0.8 us, 1.6 us} are the available data GI length. In subsequent communication between the STA and the AP, a data GI length is selected from the available data GI length according to a channel condition, to construct a PPDU.

S402. The terminal performs data communication with the access device by using the available guard interval length.

In a specific embodiment, after obtaining the available data GI length, the STA may perform data communication with the AP by using the available data GI length. Specifically, in the subsequent communication between the STA and the AP, a data GI length is selected from the available data GI length according to the channel condition, to construct the PPDU.

Further, the STA generates an association request frame according to the available data GI length and sends the association request frame to the AP. The AP analyzes the association request frame after receiving the association request frame, and if the STA is allowed to access a network, returns an association response frame to the STA. The STA analyzes the association response frame after receiving the association response frame. In this case, the STA establishes an association with the AP, and subsequently the AP and the STA may perform data communication to transmit data.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 27:
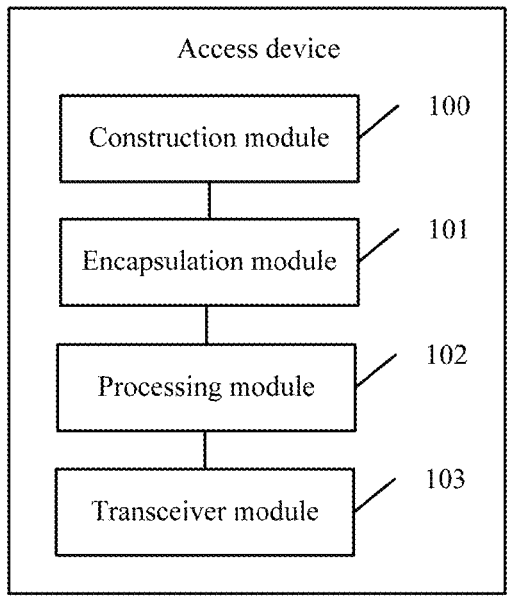
FIG. 27 is a schematic structural diagram of an access device according to the present invention.

Referring to FIG. 27, FIG. 27 is a schematic structural diagram of an access device according to the present invention. As shown in FIG. 27, the access device provided in this embodiment includes a construction module 100, an encapsulation module 101, a processing module 102, and a transceiver module 103.

The construction module 100 is configured to construct a beacon frame, where the beacon frame includes a newly added field, and the newly added field represents multiple data guard interval lengths supported by the access device.

In a specific embodiment, data GI lengths supported by a new-generation standard solution HEW being currently studied by a standardization group are {0.4 us, 0.8 us, 1.6 us, 2.4 us, 3.2 us}, and the access device may be a wireless access point (AP). In the present invention, in order that the AP better indicates data GI length information, the construction module 100 adds the newly added field into a beacon frame, denoted as an "HE supports GI" field, and the newly added filed is used to represent multiple GI lengths supported by the AP. The "HE supports GI" field is used to exchange data GI lengths respectively supported by the AP and a STA between the AP and the STA. The following provides detailed descriptions separately in aspects such as a location of the "HE supports GI" field and a format of the "HE supports GI" field.

The "HE supports GI" field may be placed in any location in the beacon frame. For example, the field may be placed in an existing element of the beacon frame, or may be placed in a newly added element created in the beacon frame. In addition, the field may also be placed in a SIG field of a presentation protocol data unit (PPDU) frame of a physical layer carrying the beacon frame. The following considers a case of creating the newly added element to place the "HE supports GI" field. The newly created element is denoted as an HE capability element. In this case, the "HE supports GI" field may be placed in the following manner.

In a first optional implementation manner, the "HE supports GI" field is directly placed in the "HE capability" element, and an "HE capability" information element includes a field used for describing an optional capability of an AP supporting a WLAN solution. The "HE supports GI" field is placed in the "HE capability" element, for example, may be placed in a manner shown in FIG. 6.

In a second optional implementation manner, the "HE supports GI" field is placed in a field of the "HE capability" element. As shown in FIG. 7, the "HE capability" element includes an "HE capability information" field, and the field is used to indicate capability information of the AP. The "HE supports GI" field may be placed in the foregoing "HE capability information" field.

In the present invention, the newly added field, that is, the "HE supports GI" field, indicates a data GI length supported by the AP, and in the new-generation standard HEW solution, a bandwidth supported by the AP may be 20 MHz, 40 MHz, 80 MHz, or 160 MHz. As shown in FIG. 8, there are multiple GI lengths in different bandwidths. The data GI length supported by the AP is a length of N (N=1, 2, 3, . . . , 32) times 0.4 us. The "HE supports GI" field may be represented in multiple manners. The following separately uses several representation manners as examples for description, and it should be noted that a specific representation manner is not limited herein.

In a first optional implementation manner, the newly added field includes an indication index value corresponding to each preset bandwidth, where the indication index value represents a minimum data guard interval length in all data guard interval lengths supported by the access device in the preset bandwidth, and the preset bandwidth may include 20 MHz, 40 MHz, 80 MHz, and 160 MHz. For ease of description, a specific representation manner may be: randomly selecting M data GI lengths from all the data GI lengths supported by the different bandwidths shown in a table in FIG. 8, as the GI length supported by the AP, which is shown in FIG. 9. N represents a serial number, a value of N is {1, 2, . . . , M}, m represents a bit quantity of an indicator bit, and N is in a one-to-one correspondence with a value of the indicator bit. Assuming that six data GI lengths are selected, that is, M=6, N={1, 2, . . . , 6}, m=3, and a relationship between N and the indicator bit is shown in FIG. 9. For ease of description, assuming that the AP does not support some data GI lengths, "-" indicates that the AP in a corresponding bandwidth does not support the GI length.

Assuming that the minimum data GI length supported by the AP is denoted as a min_GI, an index value corresponding to the min_GI is N, and each of the different bandwidths is corresponding to one min_GI. The min_GI that is supported by the AP in the different bandwidths and that is obtained according to FIG. 9, and a relationship between the min_GI and the serial number and the indicator bit are shown in FIG. 10.

The indication index value included by the "HE supports GI" field refers to an index value corresponding to a min_GI, indicated by the "HE supports GI" field, in different bandwidths. The index value corresponding to the min_GI, indicated by the "HE supports GI" field, in the different bandwidths refers to a serial number corresponding to a min_GI that is supported in each bandwidth and that is carried by the "HE supports GI" field. For example, data GI lengths supported in a bandwidth of 20 MHz are {0.8 us, 1.2 us, 1.6 us, 2.0 us, 2.4 us, 2.8 us, 3.2 us}. Assuming that a min_GI supported in the bandwidth of 20 MHz is 0.8 us, an indication index value of a serial number of 20 MHz is 2. For processing of 40 MHz, 80 MHz, and 160 MHz, refers to processing of 20 MHz. Specifically, the indication index value of the "HE supports GI" field in the beacon frame is represented in a binary-encoded form, that is, in a form of an indicator bit, and a specific representation form is shown in FIG. 11, where the "HE supports GI" field includes an indication index value in each preset bandwidth, and the indication index value GI_Idx is represented by bit information. Specific bit information representation is shown in FIG. 12.

In a second optional implementation manner, the newly added field includes an indicator bit of each preset data guard interval length, and the indicator bit is used to indicate whether the access device supports the preset data guard interval length. This implementation manner does not consider an effect of a bandwidth, and M data GI lengths are selected from data GI lengths shown in FIG. 8 as the preset data GI length. For example, the preset data GI lengths are {0.4 us, 0.8 us, 1.2 us, 1.6 us, 2.0 us, 2.4 us, 2.8 us, 3.2 us}. The "HE supports GI" field uses the indicator bit to indicate whether the AP supports the preset data GI length. The "HE supports GI" field may use a single-bit indicator bit to indicate each data GI length in all preset data GI lengths, where each bit information bit indicates one data GI length. A representation manner of the "HE supports GI" field is shown in FIG. 13, where one bit indicates one data GI length. A specific bit information indication is shown in FIG. 14.

In a third optional implementation manner, the newly added field includes an indicator bit of each preset data guard interval length in each preset bandwidth, and the indicator bit is used to indicate whether the access device supports the preset data guard interval length in the preset bandwidth. In this embodiment, as shown in FIG. 15, M data GI lengths are randomly selected from all the data GI lengths shown in FIG. 8 and supported in different bandwidths, as the data GI length supported by the AP, where M=5 herein. That the "HE supports GI" field indicates a data GI length supported in each bandwidth refers to that the "HE supports GI" field uses a single-bit indicator bit to indicate the data GI length supported by the AP, that is, each bit separately indicates a data GI length supported in different bandwidths, and a representation form of the "HE supports GI" field is shown in FIG. 16. Specific bit information is shown in FIG. 17A and FIG. 17B.

The transceiver module 103 is configured to broadcast the beacon frame and perform data communication with a terminal.

In a specific embodiment, the transceiver module 103 of the access device broadcasts the constructed beacon frame, and a specific broadcasting manner may be encapsulating the beacon frame into a PPDU format for broadcasting. There may be multiple PPDU format encapsulation manners. For example, the beacon frame may be encapsulated into a PPDU1 according to an 802.11ac in an existing standard; or another encapsulation manner may be created according to a new-generation standard HEW, to encapsulate the beacon frame into a PPDU2, so that a terminal supporting the new-generation standard HEW can identify and parse the PPDU2, where for a specific creation manner, refer to a description in a subsequent embodiment.

When a terminal STA1 supporting the 802.11ac standard and a terminal STA2 supporting the new-generation standard HEW coexist within a broadcasting range, the access device AP needs to broadcast the encapsulated PPDU1 and PPDU2, so that both the STA1 and the STA2 can access a network. A broadcasting manner of the PPDU1 may be broadcasting the PPDU1 in a specific preset period according to an existing standard. For broadcasting of the PPDU2, an operation field may be added into the PPDU1, where the operation field indicates a broadcasting time of the PPDU2, so that the PPDU2 is broadcast at the time indicated by the operation field.

After receiving the beacon frame broadcast by the AP and encapsulated into a PPDU1 format, the STA1 accesses the network according to the existing 802.11ac standard. After detecting the PPDU1 and/or the PPDU2, the STA2 parses out the beacon frame and analyzes each capability element of the beacon frame, and parses the "HE supports GI" field in the capability element to obtain a data GI length supported by the AP. The STA2 obtains, according to a data GI length supported by the STA2, an available data GI length used in communication with the AP, where the available data GI length refers to a data GI length that matches the data GI length supported by the STA2 and that is in the data GI length supported by the AP. For example, the data GI lengths supported by the STA2 are {0.8 us, 1.6 us, 2.4 us, 3.2 us}, and the data GI lengths supported by the AP are {0.4 us, 0.8 us, 1.6 us, 2.0 us, 2.4 us, 3.2 us}. It can be learned that data GI lengths supported by both the AP and the STA2 are {0.8 us, 1.6 us, 2.4 us, 3.2 us}, and in this case, {0.8 us, 1.6 us, 2.4 us, 3.2 us} are the available data GI length. Subsequently, the STA2 performs data communication with the AP by using an optional data GI length, and specifically, the STA2 may select, according to a channel condition, a data GI length from the available GI length to perform data communication with the AP.

Optionally, the access device may further include an encapsulation module 101.

The encapsulation module 101 is configured to separately encapsulate the beacon frame into a first standard protocol data unit and a second standard protocol data unit.

In a specific embodiment, a case in which a STA supporting the first standard and a STA supporting the second standard coexist in a network is considered. For example, a STA1 supports the first standard, and a STA2 supports the second standard. The foregoing first standard or second standard is a different WIFI solution, which may be an existing WIFI standard solution such as 802.11ac, or may be a new-generation standard solution HEW being currently studied by the standardization group, or may be another similar WIFI solution.

When encapsulating the beacon frame into a PPDU format, the encapsulation module 101 of the access device AP needs to encapsulate the beacon frame into two PPDU formats, which are respectively the first standard protocol data unit PPDU1 and the second standard protocol data unit PPDU2, where the PPDU1 is obtained by means of encapsulation according to the first standard, and the PPDU2 is obtained by means of encapsulation according to the second standard. For a specific encapsulation manner, refer to a description of FIG. 28.

The transceiver module 103 is specifically configured to broadcast the beacon frame encapsulated into the first standard protocol data unit and the beacon frame encapsulated into the second standard protocol data unit.

In a specific embodiment, the transceiver module 103 of the access device broadcasts the beacon frame encapsulated into the PPDU1 and the beacon frame encapsulated into the PPDU2, and a specific broadcasting manner may be broadcasting the PPDU1 in a preset period and broadcasting the PPDU2 at a specified broadcasting time. However, an operation field needs to be added into the PPDU1, and a sending time of the PPDU2 is indicated.

Optionally, the access device may further include a processing module 102.

The processing module 102 is configured to add an operation field used to indicate a sending time of the second standard protocol data unit into the first standard protocol data unit.

In a specific embodiment, the AP sends a constructed PPDU1 and PPDU2. Assuming that the PPDU1 is constructed according to the 802.11ac standard, a sending period that is of the PPDU1 and is specified in the 802.11ac standard is T1, and a time for sending the PPDU2 by the AP may be randomly specified, for example, the AP alternately sends the PPDU1 and the PPDU2. The processing module 102 may add an operation field into the PPDU1 for indication, and may also add an operation field into the PPDU2 for indication. The operation field is used to indicate the sending time of the PPDU2. The operation field may indicate the sending time of the PPDU2 in multiple indication manners, and the following lists only two manners.

In a first optional implementation manner, an HE operation field uses only one bit to indicate whether a next m*T (for example, m=⅔) period has the PPDU2, where T is a preset period of broadcasting the PPDU1. That is, if a value of the HE operation field is 1, it indicates that the next m*T period has the PPDU2; or if a value of the HE operation field is 0, it indicates that the next m*T period has no PPDU2. As shown in FIG. 25, a value of an HE operation field in a first PPDU1 from the left is 1, so that it indicates that the next m*T period has the PPDU2; and a value of an HE operation field in a second PPDU1 is 0, so that the next m*T period has no PPDU2.

In a second optional implementation manner, the HE operation field has two or more bits, denoted as x bits. The HE operation field may be used to indicate whether a next (n+m*T) (for example, m=⅔, and n is a natural number indicated by the x bits) period has the PPDU2. That is, if the value of the HE operation field is n, it indicates that the next (n+m*T) period has the PPDU2. As shown in FIG. 26, a value of an HE operation field in a first PPDU1 from the left is 1, so that it indicates that the next m*T period has the PPDU2; and a value of an HE operation field in a second PPDU1 is 2, so that next two m*T periods have the PPDU2.

The transceiver module 103 is specifically configured to broadcast, in a preset period, the first standard protocol data unit including the operation field.

In a specific embodiment, the transceiver module 103 of the access device broadcasts, in a specific preset period, a PPDU1 including an operation field. The PPDU1 may be encapsulated according to the 802.11ac standard, and therefore the PPDU1 may be broadcast according to a preset period in the 802.11ac standard.

The transceiver module 103 is further configured to broadcast the second standard protocol data unit at the sending time indicated by the operation field.

In a specific embodiment, as shown in FIG. 25 or FIG. 26, the transceiver module 103 of the access device broadcasts the PPDU2 at the sending time indicated by the operation field. When receiving the PPDU1, the terminal may learn the sending time of the PPPDU2 according to the operation field, and receive the PPDU2 at the learned sending time.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 28:
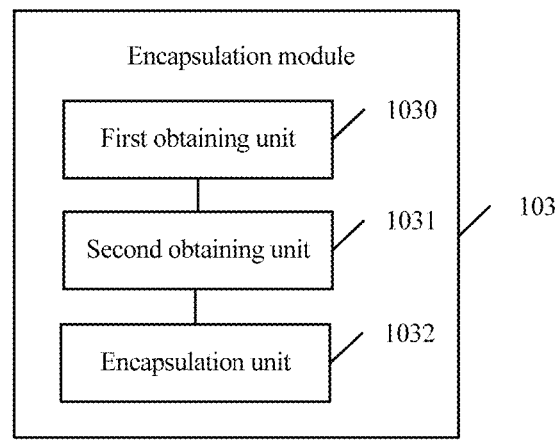
FIG. 28 is a schematic structural diagram of an encapsulation module according to the present invention.

Referring to FIG. 28, FIG. 28 is a schematic structural diagram of an encapsulation module according to the present invention. As shown in FIG. 28, the encapsulation module in this embodiment includes a first obtaining unit 1030, a second obtaining unit 1031, and an encapsulation unit 1032.

The first obtaining unit 1030 is configured to obtain a maximum data guard interval length in the data guard interval length supported by the access device in the first standard, and determine the maximum data guard interval length as a first alternative data guard interval length.

In a specific embodiment, the AP separately supports a set of data GI lengths in the first standard and the second standard. The first alternative data GI length refers to a maximum data GI length in a set of GIs supported by the AP in the first standard. For example, assuming that the data GI lengths supported by the AP in the first standard are {0.4 us, 0.8 us}, the first alternative data GI length refers to a data GI length of 0.8 us.

The second obtaining unit 1031 is configured to obtain a maximum data guard interval length in the data guard interval length supported by the access device in the second standard, and determine the maximum data guard interval length as a second alternative data guard interval length.

In a specific embodiment, the AP also supports a set of data GI lengths in the second standard, and the second alternative data guard interval length refers to a maximum data GI length in a set of GIs supported by the AP in the second standard. For example, assuming that the set of data GI lengths supported by the AP in the second standard is {0.4 us, 0.8 us, 1.6 us, 2.4 us, 3.2 us}, the second alternative data GI length refers to a data GI length of 3.2 us.

It should be noted that in a case in which STAs supporting different standards in a network are more diverse, that is, multiple types of STAs exist, different types of STAs support different standards, but compatibility may exist between the STAs supporting the different standards. However, the STAs can only be forward compatible instead of backward compatible. For example, a STA supporting the HEW can be compatible with a STA supporting the 802.11ac standard, but the STA supporting the 802.11ac standard cannot be compatible with the STA supporting the HEW. When the multiple types of STAs exist in the network, for example, a quantity of different standards supported by the diverse STAs in the network is 3, 4, or more, the alternative data GI lengths may be correspondingly determined, and in this case, a quantity of the alternative data GI lengths is correspondingly 3, 4, or more. For ease of description, the following describes content by assuming that two STAs existing in the network support the first standard (such as the 802.11ac standard solution) and the second standard (such as a current HEW standard solution), respectively, and the alternative data GI lengths are denoted as GI1 and GI2.

The encapsulation unit 1032 is configured to separately encapsulate the beacon frame into the first standard protocol data unit and the second standard protocol data unit according to the first alternative data guard interval length and the second alternative data guard interval length.

In a specific embodiment, the encapsulation unit 1032 of the access device encapsulates the beacon frame into the first standard protocol data unit PPDU1 and the second standard protocol data unit PPDU2 according to the first alternative data guard interval length GI1 and the second alternative data guard interval length GI2, and the constructed PPDU1 and PPDU2 need to comply with PPDU formats in respective standards. The following separately describes formats of the PPDU1 and the PPDU2.

Optionally, as shown in FIG. 18, the PPDU1 format includes a preamble and bearer data, the bearer data includes the beacon frame, and a preamble GI length and a data GI length in the PPDU1 format each are GI1. A purpose of sending the PPDU1 by the AP is to enable the STA1 supporting the first standard to detect the network. The first standard may be the 802.11ac standard.

Optionally, the second standard may be the HEW standard. With reference to the HEW standard, the PPDU2 format has multiple designing methods, which are not limited herein. The following lists three optional PPDU2 format designs.

In a first optional implementation manner, as shown in FIG. 19, the PPDU2 includes a legacy preamble, a high efficiency wireless local area network preamble, and bearer data, where a combination of an L-STF, an L-LTF, and an L-SIG is referred to as the legacy preamble, and a combination of an HE-SIG, an HE-STF, and another possible field is referred to as the HEW preamble. A GI length of the legacy preamble, a GI length of the HEW preamble, and a GI length of the bearer data each are GI2. A purpose of sending the PPDU2 by the AP is to enable the STA2 supporting the second standard to detect the network. It should be noted that the STA2 can also detect the PPDU1 and process the PPDU1. Description of all fields in FIG. 19 is shown in FIG. 20.

In a second optional implementation manner, as shown in FIG. 21, the PPDU2 format includes a legacy preamble, a high efficiency wireless local area network preamble, and bearer data, where a GI length of the legacy preamble is GI1, and a GI length of the HEW preamble and a GI length of the bearer data each are GI2. A purpose of sending the PPDU2 by the AP is to enable the STA2 supporting the second standard to detect the network. The length, obtained from FIG. 20, of the legacy preamble in the PPDU2 format in the first optional implementation manner is 80 us. The length, obtained from FIG. 22, of the legacy preamble in the PPDU2 format in the second optional implementation manner is 20 us. In a case in which lengths of remaining fields are the same, transmission overheads are reduced by 60 us in the second optional implementation manner. Description of all fields in FIG. 21 is shown in FIG. 22.

In a third optional implementation manner, the PPDU2 format is shown in FIG. 23, and the PPDU2 includes a high efficiency wireless local area network preamble and bearer data. Description of all fields in FIG. 23 is shown in FIG. 24. A GI length of the HEW preamble and a GI length of the bearer data each are GI2, and a purpose of sending the PPDU2 by the AP is to enable the STA2 supporting the second standard to detect the network. Compared with the PPDU format in the first optional implementation manner, the PPDU format in the third optional implementation manner removes a legacy preamble. Therefore, in a case in which lengths of remaining fields are the same, transmission overheads are reduced by 80 us compared with the PPDU format in the first optional implementation manner.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 29:
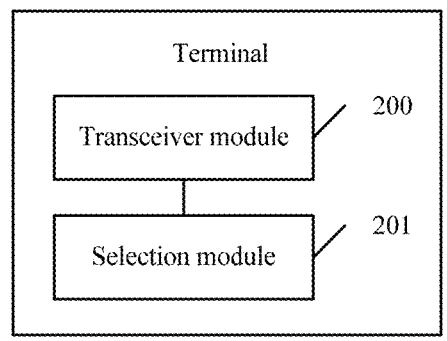
FIG. 29 is a schematic structural diagram of a terminal according to the present invention.

Referring to FIG. 29, FIG. 29 is a schematic structural diagram of a terminal according to an embodiment. As shown in FIG. 29, the terminal in this embodiment includes a transceiver module 200 and a selection module 201.

The transceiver module 200 is configured to obtain a beacon frame broadcast by an access device, where the beacon frame includes a newly added field, and the newly added field represents multiple data guard interval lengths supported by the access device.

In a specific embodiment, the transceiver module 200 of the terminal STA obtains the beacon frame broadcast by the access device, where the beacon frame may be a beacon frame, the beacon frame includes the newly added field, and the newly added field represents the multiple data GI lengths supported by the access device. A processing procedure of the STA is corresponding to the foregoing processing procedure of the access device AP. An AP side encapsulates the beacon frame into a first standard protocol data unit PPDU1 and a second standard protocol data unit PPDU2, where the first standard may be the 802.11ac standard, and the second standard may be a HEW standard. In this embodiment, when a STA1 supporting the first standard and a STA2 supporting the second standard exist in a network, the STA1 can perform normal detection processing only on the PPDU1. For a detection processing method, refer to the 802.11ac standard solution, which is not described in detail herein. The STA processing procedure described herein refers to the foregoing processing procedure of the STA2.

The AP sends the PPDU1 in a preset period, where the PPDU1 includes an operation field used to indicate the sending time of the PPDU2, and the operation field indicates the sending time of the PPDU2. Specifically, a method used by the STA to obtain the beacon frame broadcast by the AP may have three optional implementation manners:

Optionally, the transceiver module 200 is specifically configured to obtain the first standard protocol data unit broadcast by the access device, and parse out the beacon frame from the first standard protocol data unit.

In a first optional implementation manner, if the STA obtains the PPDU1 broadcast by the AP, the STA processes the PPDU1 and parses out the beacon frame from the PPDU1, and at the same time, the STA determines a preamble length in subsequent data communication between the STA and the AP according to a preamble of the PPDU1. For example, if the preamble of the PPDU1 is GI1, the STA sets the preamble in the subsequent data communication to GI1.

Optionally, the transceiver module 200 is specifically configured to obtain the second standard protocol data unit broadcast by the access device, and parse out the beacon frame from the second standard protocol data unit.

In a second optional implementation manner, if the STA obtains the PPDU2 broadcast by the AP, the STA processes the PPDU2 and parses out the beacon frame from the PPDU2, and at the same time, the STA determines a preamble length in subsequent data communication between the STA and the AP according to a preamble of the PPDU2. For example, if the preamble of the PPDU2 is GI2, the STA sets the preamble in the subsequent data communication to GI2.

Optionally, the transceiver module 200 is specifically configured to obtain the first standard protocol data unit broadcast by the access device, determine the sending time of the second standard protocol data unit from the operation field in the first standard protocol data unit, obtain the second standard protocol data unit according to the sending time, and parse out the beacon frame from the second standard protocol data unit.

In a third optional implementation manner, if the STA receives the PPDU1, the STA obtains a sending time of a next PPDU2 from the PPDU1 by parsing the "HE operation" field. For example, assuming that the "HE operation" uses a bit to indicate whether a next period has the PPDU2, if the "HE operation" field indicates 0, it indicates that the STA needs to detect the PPDU2 in the next period; or if the "HE operation" field indicates 1, it indicates that the STA does not need to detect the PPDU2 in the next period. The STA parses out the beacon frame from the detected PPDU2. In addition, the STA determines a preamble length in subsequent data communication between the STA and the AP according to the preamble of the PPDU2. For example, if the preamble of the PPDU2 is GI2, the STA sets the preamble in the subsequent data communication to GI2.

The selection module 201 is configured to select an available guard interval length matching a data guard interval length supported by the terminal from the multiple data guard interval lengths supported by the access device.

In a specific embodiment, the terminal STA analyzes the beacon frame after obtaining the beacon frame. A specific analysis manner may be: the STA detects all capability elements of the beacon frame and obtains a data GI length supported by the AP by parsing an "HE supports GI" field; and the selection module 201 of the STA sets the available GI length according to the data GI length supported by the STA and the obtained data GI length supported by the AP. For example, assuming that data GI lengths indicated by information about the "HE supports GI" field are {0.8 us, 1.6 us, 2.4 us}, data GI lengths supported by the AP are {0.8 us, 1.6 us, 2.4 us}. GI lengths supported by the STA itself are {0.4 us, 0.8 us, 1.6 us, 2.4 us, 3.2 us}. It can be learned that data GI lengths supported by both the AP and the STA2 are {0.8 us, 1.6 us}, and in this case, {0.8 us, 1.6 us} are the available data GI length. In subsequent communication between the STA and the AP, a data GI length is selected from the available data GI length according to a channel condition, to construct a PPDU.

The transceiver module 200 is further configured to perform data communication with the access device by using the available guard interval length.

In a specific embodiment, after the STA obtains the available data GI length, the transceiver module 200 may perform data communication with the AP by using the available data GI length. Specifically, in subsequent communication between the STA and the AP, a data GI length is selected from the available data GI length according to the channel condition, to construct the PPDU.

Further, the STA generates an association request frame according to the available data GI length and sends the association request frame to the AP. The AP analyzes the association request frame after receiving the association request frame, and if the STA is allowed to access a network, returns an association response frame to the STA. The STA analyzes the association response frame after receiving the association response frame. In this case, the STA establishes an association with the AP, and subsequently the AP and the STA may perform data communication to transmit data.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 30:
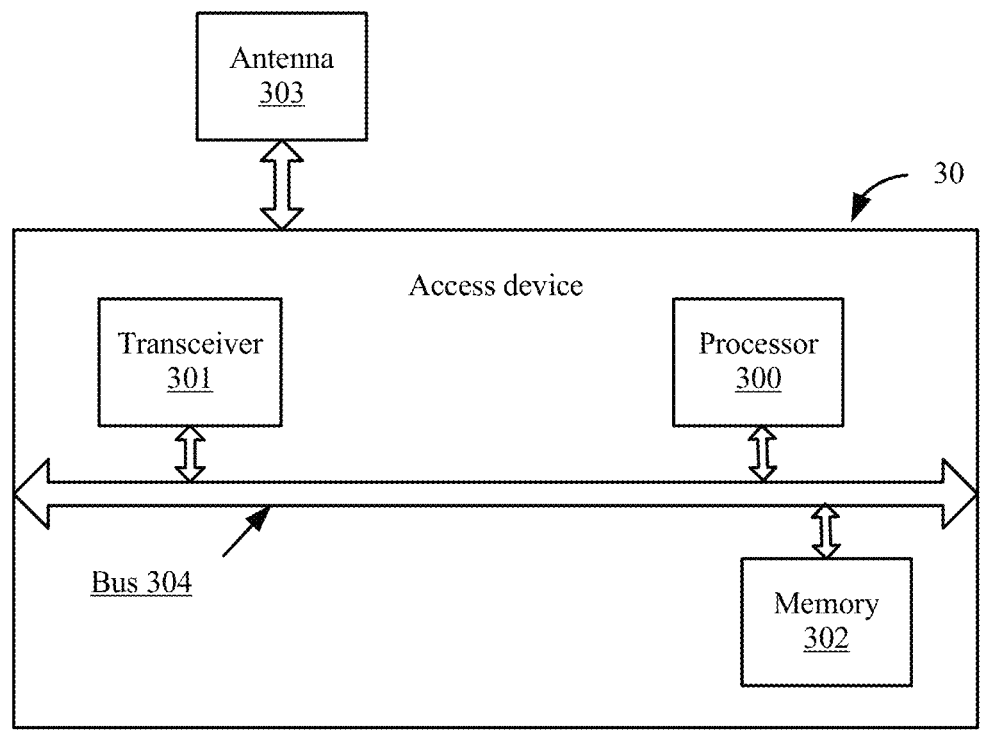
FIG. 30 is a schematic structural diagram of another access device according to the present invention.

Referring to FIG. 30, FIG. 30 is a schematic structural diagram of another access device according to the present invention. An access device 30 in FIG. 30 may be configured to implement all steps and methods in the foregoing method embodiments. In the embodiment of FIG. 30, the access device 30 includes a processor 300, a transceiver 301, a memory 302, an antenna 303, and a bus 304. The processor 300 controls an operation of the access device 30 and may be configured to process a signal. The memory 302 may include a read-only memory and a random access memory, and provides an instruction and data for the processor 300. The transceiver 301 may be coupled to the antenna 303. All components of the access device 30 are coupled together by using a bus system 304, where the bus system 304 further includes a power bus, a control bus, and a status signal bus in addition to a data bus. However, for clarity of description, various buses are marked as the bus system 304 in the figure. The access device 30 may be the AP shown in FIG. 1. The following describes all components in detail.

The processor is configured to construct a beacon frame, where the beacon frame includes a newly added field, and the newly added field represents multiple data guard interval lengths supported by the access device.

The transceiver is configured to broadcast the beacon frame and perform data communication with a terminal.

Optionally, data GI lengths supported by a new-generation standard solution HEW being currently studied by a standardization group are {0.4 us, 0.8 us, 1.6 us, 2.4 us, 3.2 us}, and the access device may be a wireless access point (AP). In the present invention, in order that the AP better indicates data GI length information, the newly added field is added into the beacon frame, denoted as an "HE supports GI" field, and the newly added field is used to represent the multiple GI lengths supported by the AP. The "HE supports GI" field is used to exchange data GI lengths respectively supported by the AP and a STA between the AP and the STA. The following provides detailed descriptions separately in aspects such as a location of the "HE supports GI" field and a format of the "HE supports GI" field.

The "HE supports GI" field may be placed in any location in the beacon frame. For example, the field may be placed in an existing element of the beacon frame, or may be placed in a newly added element created in the beacon frame. In addition, the field may also be placed in a SIG field of a presentation protocol data unit (PPDU) frame of a physical layer carrying the beacon frame. The following considers a case of creating the newly added element to place the "HE supports GI" field. The newly created element is denoted as an HE capability element. In this case, the "HE supports GI" field may be placed in the following manner.

In a first optional implementation manner, the "HE supports GI" field is directly placed in the "HE capability" element, and an "HE capability" information element includes a field used for describing an optional capability of an AP supporting a WLAN solution. The "HE supports GI" field is placed in the "HE capability" element, for example, may be placed in a manner shown in FIG. 6.

In a second optional implementation manner, the "HE supports GI" field is placed in a field of the "HE capability" element. As shown in FIG. 7, the "HE capability" element includes an "HE capability information" field, and the field is used to indicate capability information of the AP. The "HE supports GI" field may be placed in the foregoing "HE capability information" field.

In the present invention, the newly added field, that is, the "HE supports GI" field, indicates a data GI length supported by the AP, and in the new-generation standard HEW solution, a bandwidth supported by the AP may be 20 MHz, 40 MHz, 80 MHz, or 160 MHz. As shown in FIG. 8, there are multiple GI lengths in different bandwidths. The data GI length supported by the AP is a length of N (N=1, 2, 3, . . . , 32) times 0.4 us. The "HE supports GI" field may be represented in multiple manners. The following separately uses several representation manners as examples for description, and it should be noted that a specific representation manner is not limited herein.

In a first optional implementation manner, the newly added field includes an indication index value corresponding to each preset bandwidth, where the indication index value represents a minimum data guard interval length in all data guard interval lengths supported by the access device in the preset bandwidth, and the preset bandwidth may include 20 MHz, 40 MHz, 80 MHz, and 160 MHz. For ease of description, a specific representation manner may be: randomly selecting M data GI lengths from all the data GI lengths supported by the different bandwidths shown in a table in FIG. 8, as the GI length supported by the AP, which is shown in FIG. 9. N represents a serial number, a value of N is {1, 2, . . . , M}, m represents a bit quantity of an indicator bit, and N is in a one-to-one correspondence with a value of the indicator bit. Assuming that six data GI lengths are selected, that is, M=6, N={1, 2, . . . , 6}, m=3, and a relationship between N and the indicator bit is shown in FIG. 9. For ease of description, assuming that the AP does not support some data GI lengths, "-" indicates that the AP in a corresponding bandwidth does not support the GI length.

Assuming that the minimum data GI length supported by the AP is denoted as a min_GI, an index value corresponding to the min_GI is N, and each of the different bandwidths is corresponding to one min_GI. The min_GI that is supported by the AP in the different bandwidths and that is obtained according to FIG. 9, and a relationship between the min_GI and the serial number and the indicator bit are shown in FIG. 10.

The indication index value included by the "HE supports GI" field refers to an index value corresponding to a min_GI, indicated by the "HE supports GI" field, in different bandwidths. The index value corresponding to the min_GI, indicated by the "HE supports GI" field, in the different bandwidths refers to a serial number corresponding to a min_GI that is supported in each bandwidth and that is carried by the "HE supports GI" field. For example, data GI lengths supported in a bandwidth of 20 MHz are {0.8 us, 1.2 us, 1.6 us, 2.0 us, 2.4 us, 2.8 us, 3.2 us}. Assuming that a min_GI supported in the bandwidth of 20 MHz is 0.8 us, an indication index value of a serial number of 20 MHz is 2. For processing of 40 MHz, 80 MHz, and 160 MHz, refers to processing of 20 MHz. Specifically, the indication index value of the "HE supports GI" field in the beacon frame is represented in a binary-encoded form, that is, in a form of an indicator bit, and a specific representation form is shown in FIG. 11, where the "HE supports GI" field includes an indication index value in each preset bandwidth, and the indication index value GI_Idx is represented by bit information. Specific bit information representation is shown in FIG. 12.

In a second optional implementation manner, the newly added field includes an indicator bit of each preset data guard interval length, and the indicator bit is used to indicate whether the access device supports the preset data guard interval length. This implementation manner does not consider an effect of a bandwidth, and M data GI lengths are selected from data GI lengths shown in FIG. 8 as the preset data GI length. For example, the preset data GI lengths are {0.4 us, 0.8 us, 1.2 us, 1.6 us, 2.0 us, 2.4 us, 2.8 us, 3.2 us}.

The "HE supports GI" field uses the indicator bit to indicate whether the AP supports the preset data GI length. The "HE supports GI" field may use a single-bit indicator bit to indicate each data GI length in all preset data GI lengths, where each bit information bit indicates one data GI length. A representation manner of the "HE supports GI" field is shown in FIG. 13, where one bit indicates one data GI length. A specific bit information indication is shown in FIG. 14.

In a third optional implementation manner, the newly added field includes an indicator bit of each preset data guard interval length in each preset bandwidth, and the indicator bit is used to indicate whether the access device supports the preset data guard interval length in the preset bandwidth. In this embodiment, as shown in FIG. 15, M data GI lengths are randomly selected from all the data GI lengths shown in FIG. 8 and supported in different bandwidths, as the data GI length supported by the AP, where M=5 herein. That the "HE supports GI" field indicates a data GI length supported in each bandwidth refers to that the "HE supports GI" field uses a single-bit indicator bit to indicate the data GI length supported by the AP, that is, each bit separately indicates a data GI length supported in different bandwidths, and a representation form of the "HE supports GI" field is shown in FIG. 16. Specific bit information is shown in FIG. 17A and FIG. 17B.

Optionally, the access device broadcasts the constructed beacon frame, and a specific broadcasting manner may be encapsulating the beacon frame into a PPDU format for broadcasting. There may be multiple PPDU format encapsulation manners. For example, the beacon frame may be encapsulated into a PPDU1 according to 802.11ac in an existing standard; or another encapsulation manner may be created according to the new-generation standard HEW, to encapsulate the beacon frame into a PPDU2, so that a terminal supporting the new-generation standard HEW can identify and parse the PPDU2, where for a specific creation manner, refer to a description of FIG. 3.

When a terminal STA1 supporting the 802.11ac standard and a terminal STA2 supporting the new-generation standard HEW coexist within a broadcasting range, the access device AP needs to broadcast the encapsulated PPDU1 and PPDU2, so that both the STA1 and the STA2 can access a network. A broadcasting manner of the PPDU1 may be broadcasting the PPDU1 in a specific preset period according to an existing standard. For broadcasting of the PPDU2, an operation field may be added into the PPDU1, where the operation field indicates a broadcasting time of the PPDU2, so that the PPDU2 is broadcast at the time indicated by the operation field.

After receiving the beacon frame broadcast by the AP and encapsulated into a PPDU1 format, the STA1 accesses the network according to the existing 802.11ac standard. After detecting the PPDU1 and/or the PPDU2, the STA2 parses out the beacon frame and analyzes each capability element of the beacon frame, and parses the "HE supports GI" field in the capability element to obtain a data GI length supported by the AP. The STA2 obtains, according to a data GI length supported by the STA2, an available data GI length used in communication with the AP, where the available data GI length refers to a data GI length that matches the data GI length supported by the STA2 and that is in the data GI length supported by the AP. For example, the data GI lengths supported by the STA2 are {0.8 us, 1.6 us, 2.4 us, 3.2 us}, and the data GI lengths supported by the AP are {0.4 us, 0.8 us, 1.6 us, 2.0 us, 2.4 us, 3.2 us}. It can be learned that data GI lengths supported by both the AP and the STA2 are {0.8 us, 1.6 us, 2.4 us, 3.2 us}, and in this case, {0.8 us, 1.6 us, 2.4 us, 3.2 us} are the available data GI length. Subsequently, the STA2 performs data communication with the AP by using an optional data GI length, and specifically, the STA2 may select, according to a channel condition, a data GI length from the available GI length to perform data communication with the AP.

The processor is further configured to encapsulate the beacon frame into a first standard protocol data unit and a second standard protocol data unit.

The transceiver is further configured to broadcast the beacon frame encapsulated into the first standard protocol data unit and the beacon frame encapsulated into the second standard protocol data unit.

Optionally, a case in which a STA supporting the first standard and a STA supporting the second standard coexist in a network is considered. For example, a STA1 supports the first standard, and a STA2 supports the second standard. The foregoing first standard or second standard is a different WIFI solution, which may be an existing WIFI standard solution such as 802.11ac, or may be a new-generation standard solution HEW being currently studied by the standardization group, or may be another similar WIFI solution.

When encapsulating the beacon frame into a PPDU format, the access device AP needs to encapsulate the beacon frame into two PPDU formats, which are respectively the first standard protocol data unit PPDU1 and the second standard protocol data unit PPDU2, where the PPDU1 is obtained by means of encapsulation according to the first standard, and the PPDU2 is obtained by means of encapsulation according to the second standard.

Optionally, the access device broadcasts the beacon frame encapsulated into the PPDU1 and the beacon frame encapsulated into the PPDU2, and a specific broadcasting manner may be broadcasting the PPDU1 in a preset period and broadcasting the PPDU2 at a specified broadcasting time. However, an operation field needs to be added into the PPDU1, and a sending time of the PPDU2 is indicated.

The processor is further configured to obtain a maximum data guard interval length in the data guard interval length supported by the access device in the first standard, and determine the maximum data guard interval length as a first alternative data guard interval length.

The processor is further configured to obtain a maximum data guard interval length in the data guard interval length supported by the access device in the second standard, and determine the maximum data guard interval length as a second alternative data guard interval length.

The processor is further configured to separately encapsulate the beacon frame into the first standard protocol data unit and the second standard protocol data unit according to the first alternative data guard interval length and the second alternative data guard interval length.

Optionally, the AP separately supports a set of data GI lengths in the first standard and the second standard. The first alternative data GI length refers to a maximum data GI length in a set of GIs supported by the AP in the first standard. For example, assuming that the data GI lengths supported by the AP in the first standard are {0.4 us, 0.8 us}, the first alternative data GI length refers to a data GI length of 0.8 us.

Optionally, the AP also supports a set of data GI lengths in the second standard, and the second alternative data guard interval length refers to a maximum data GI length in a set of GIs supported by the AP in the second standard. For example, assuming that the set of data GI lengths supported by the AP in the second standard is {0.4 us, 0.8 us, 1.6 us, 2.4 us, 3.2 us}, the second alternative data GI length refers to a data GI length of 3.2 us.

It should be noted that in a case in which STAs supporting different standards in a network are more diverse, that is, multiple types of STAs exist, different types of STAs support different standards, but compatibility may exist between the STAs supporting the different standards. However, the STAs can only be forward compatible instead of backward compatible. For example, a STA supporting the HEW can be compatible with a STA supporting the 802.11ac standard, but the STA supporting the 802.11ac standard cannot be compatible with the STA supporting the HEW. When the multiple types of STAs exist in the network, for example, a quantity of different standards supported by the diverse STAs in the network is 3, 4, or more, the alternative data GI lengths may be correspondingly determined, and in this case, a quantity of the alternative data GI lengths is correspondingly 3, 4, or more. For ease of description, the following describes content by assuming that two STAs existing in the network support the first standard (such as the 802.11ac standard solution) and the second standard (such as a current HEW standard solution), respectively, and the alternative data GI lengths are denoted as GI1 and GI2.

Optionally, the access device encapsulates the beacon frame into the first standard protocol data unit PPDU1 and the second standard protocol data unit PPDU2 according to the first alternative data guard interval length GI1 and the second alternative data guard interval length GI2, and the constructed PPDU1 and PPDU2 need to comply with PPDU formats in respective standards. The following separately describes formats of the PPDU1 and the PPDU2.

Optionally, as shown in FIG. 18, the PPDU1 format includes a preamble and bearer data, the bearer data includes the beacon frame, and a preamble GI length and a data GI length in the PPDU1 format each are GI1. A purpose of sending the PPDU1 by the AP is to enable the STA1 supporting the first standard to detect the network. The first standard may be the 802.11ac standard.

Optionally, the second standard may be the HEW standard. With reference to the HEW standard, the PPDU2 format has multiple designing methods, which are not limited herein. The following lists three optional PPDU2 format designs.

In a first optional implementation manner, as shown in FIG. 19, the PPDU2 includes a legacy preamble, a high efficiency wireless local area network preamble, and bearer data, where a combination of an L-STF, an L-LTF, and an L-SIG is referred to as the legacy preamble, and a combination of an HE-SIG, an HE-STF, and another possible field is referred to as the HEW preamble. A GI length of the legacy preamble, a GI length of the HEW preamble, and a GI length of the bearer data each are GI2. A purpose of sending the PPDU2 by the AP is to enable the STA2 supporting the second standard to detect the network. It should be noted that the STA2 can also detect the PPDU1 and process the PPDU1. Description of all fields in FIG. 19 is shown in FIG. 20.

In a second optional implementation manner, as shown in FIG. 21, the PPDU2 format includes a legacy preamble, a high efficiency wireless local area network preamble, and bearer data, where a GI length of the legacy preamble is GI1, and a GI length of the HEW preamble and a GI length of the bearer data each are GI2. A purpose of sending the PPDU2 by the AP is to enable the STA2 supporting the second standard to detect the network. The length, obtained from FIG. 20, of the legacy preamble in the PPDU2 format in the first optional implementation manner is 80 us. The length, obtained from FIG. 22, of the legacy preamble in the PPDU2 format in the second optional implementation manner is 20 us. In a case in which lengths of remaining fields are the same, transmission overheads are reduced by 60 us in the second optional implementation manner. Description of all fields in FIG. 21 is shown in FIG. 22.

In a third optional implementation manner, the PPDU2 format is shown in FIG. 23, and the PPDU2 includes a high efficiency wireless local area network preamble and bearer data. Description of all fields in FIG. 23 is shown in FIG. 24. A GI length of the HEW preamble and a GI length of the bearer data each are GI2, and a purpose of sending the PPDU2 by the AP is to enable the STA2 supporting the second standard to detect the network. Compared with the PPDU format in the first optional implementation manner, the PPDU format in the third optional implementation manner removes a legacy preamble. Therefore, in a case in which lengths of remaining fields are the same, transmission overheads are reduced by 80 us compared with the PPDU format in the first optional implementation manner.

The processor is further configured to add an operation field used to indicate a sending time of the second standard protocol data unit into the first standard protocol data unit.

The transceiver is further configured to broadcast, in a preset period, the first standard protocol data unit including the operation field.

The transceiver is further configured to broadcast the second standard protocol data unit at the sending time indicated by the operation field.

Optionally, the AP sends a constructed PPDU1 and PPDU2. Assuming that the PPDU1 is constructed according to the 802.11ac standard, a sending period that is of the PPDU1 and is specified in the 802.11ac standard is T1, and a time for sending the PPDU2 by the AP may be randomly specified, for example, the AP alternately sends the PPDU1 and the PPDU2. An operation field may be added into the PPDU1 for indication, and an operation field may also be added into the PPDU2 for indication. The operation field is used to indicate the sending time of the PPDU2. The operation field may indicate the sending time of the PPDU2 in multiple indication manners, and the following lists only two manners.

In a first optional implementation manner, an HE operation field uses only one bit to indicate whether a next m*T (for example, m=⅔) period has the PPDU2, where T is a preset period of broadcasting the PPDU1. That is, if a value of the HE operation field is 1, it indicates that the next m*T period has the PPDU2; or if a value of the HE operation field is 0, it indicates that the next m*T period has no PPDU2. As shown in FIG. 25, a value of an HE operation field in a first PPDU1 from the left is 1, so that it indicates that the next m*T period has the PPDU2; and a value of an HE operation field in a second PPDU1 is 0, so that the next m*T period has no PPDU2.

In a second optional implementation manner, the HE operation field has two or more bits, denoted as x bits. The HE operation field may be used to indicate whether a next (n+m*T) (for example, m=⅔, and n is a natural number indicated by the x bits) period has the PPDU2. That is, if the value of the HE operation field is n, it indicates that the next (n+m*T) period has the PPDU2. As shown in FIG. 26, a value of an HE operation field in a first PPDU1 from the left is 1, so that it indicates that the next m*T period has the PPDU2; and a value of an HE operation field in a second PPDU1 is 2, so that next two m*T periods have the PPDU2.

Optionally, the access device broadcasts, in a specific preset period, a PPDU1 including an operation field. The PPDU1 may be encapsulated according to the 802.11ac standard, and therefore the PPDU1 may be broadcast according to a preset period in the 802.11ac standard.

Optionally, as shown in FIG. 25 or FIG. 26, the access device broadcasts the PPDU2 at the sending time indicated by the operation field. When receiving the PPDU1, the terminal may learn the sending time of the PPPDU2 according to the operation field, and receive the PPDU2 at the learned sending time.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

Figure 31:
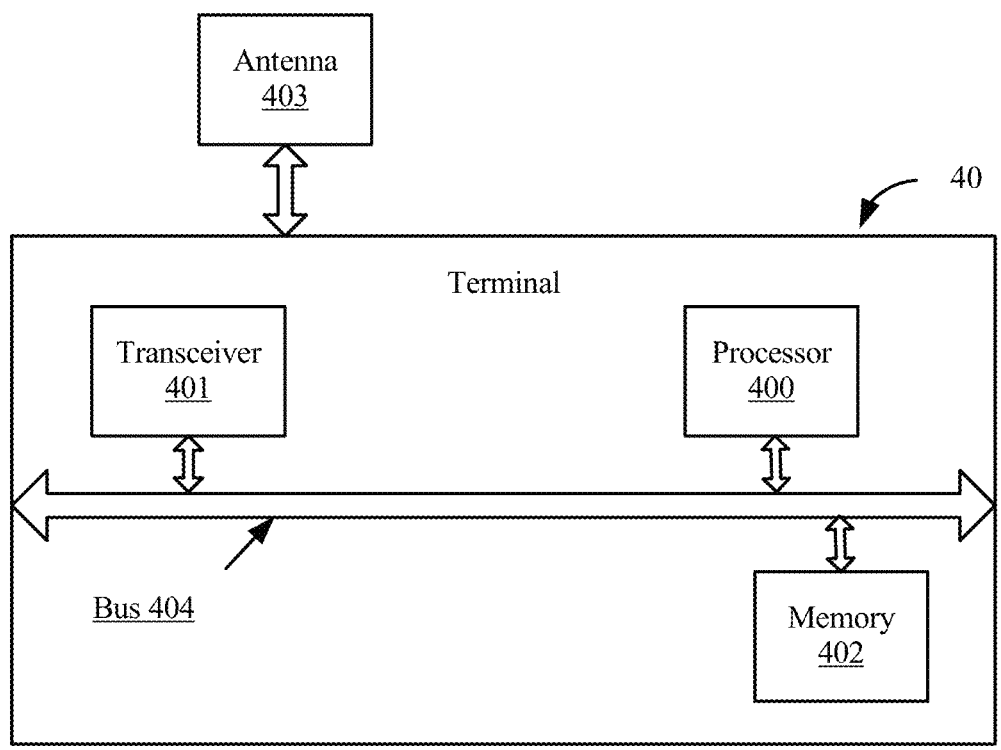
FIG. 31 is a schematic structural diagram of another terminal according to the present invention.

Referring to FIG. 31, FIG. 31 is a schematic structural diagram of another terminal according to the present invention. A terminal 40 in FIG. 31 may be configured to implement all steps and methods in the foregoing method embodiments. In the embodiment of FIG. 31, the terminal 40 includes a processor 400, a transceiver 401, a memory 402, an antenna 403, and a bus 404. The processor 400 controls an operation of the terminal 40 and may be configured to process a signal. The memory 402 may include a read-only memory and a random access memory, and provides an instruction and data for the processor 400. The transceiver 401 may be coupled to the antenna 403. Components in the terminal 40 are coupled together by using a bus system 404, where the bus system 404 further includes a power supply bus, a control bus, and a status signal bus in addition to a data bus. However, for clarity of description, various buses are marked as the bus system 404 in the figure. For example, the terminal 40 may be the STA1, STA2, and STA3 shown in FIG. 1. The following describes all components of the terminal 40 in detail.

The transceiver is configured to obtain a beacon frame broadcast by an access device, where the beacon frame includes a newly added field, and the newly added field represents multiple data guard interval lengths supported by the access device.

The processor is configured to select an available guard interval length matching a data guard interval length supported by the terminal from the multiple data guard interval lengths supported by the access device.

The transceiver is configured to perform data communication with the access device by using the available guard interval length.

Optionally, a terminal STA obtains the beacon frame broadcast by the access device, where the beacon frame may be a beacon frame, the beacon frame includes the newly added field, and the newly added field represents the multiple data GI lengths supported by the access device. A processing procedure of the STA is corresponding to the foregoing processing procedure of the access device AP. An AP side encapsulates the beacon frame into a first standard protocol data unit PPDU1 and a second standard protocol data unit PPDU2, where the first standard may be the 802.11ac standard, and the second standard may be a HEW standard. In this embodiment, when a STA1 supporting the first standard and a STA2 supporting the second standard exist in a network, the STA1 can perform normal detection processing only on the PPDU1. For a detection processing method, refer to the 802.11ac standard solution, which is not described in detail herein. The STA processing procedure described herein refers to the foregoing processing procedure of the STA2.

The AP sends the PPDU1 in a preset period, where the PPDU1 includes an operation field used to indicate the sending time of the PPDU2, and the operation field indicates the sending time of the PPDU2. Specifically, a method used by the STA to obtain the beacon frame broadcast by the AP may have three optional implementation manners:

In a first optional implementation manner, if the STA obtains the PPDU1 broadcast by the AP, the STA processes the PPDU1 and parses out the beacon frame from the PPDU1, and at the same time, the STA determines a preamble length in subsequent data communication between the STA and the AP according to a preamble of the PPDU1. For example, if the preamble of the PPDU1 is GI1, the STA sets the preamble in the subsequent data communication to GI1.

In a second optional implementation manner, if the STA obtains the PPDU2 broadcast by the AP, the STA processes the PPDU2 and parses out the beacon frame from the PPDU2, and at the same time, the STA determines a preamble length in subsequent data communication between the STA and the AP according to a preamble of the PPDU2. For example, if the preamble of the PPDU2 is GI2, the STA sets the preamble in the subsequent data communication to GI2.

In a third optional implementation manner, if the STA receives the PPDU1, the STA obtains a sending time of a next PPDU2 from the PPDU1 by parsing the "HE operation" field. For example, assuming that the "HE operation" uses a bit to indicate whether a next period has the PPDU2, if the "HE operation" field indicates 0, it indicates that the STA needs to detect the PPDU2 in the next period; or if the "HE operation" field indicates 1, it indicates that the STA does not need to detect the PPDU2 in the next period. The STA parses out the beacon frame from the detected PPDU2. In addition, the STA determines a preamble length in subsequent data communication between the STA and the AP according to the preamble of the PPDU2. For example, if the preamble of the PPDU2 is GI2, the STA sets the preamble in the subsequent data communication to GI2.

Optionally, the terminal STA analyzes the beacon frame after obtaining the beacon frame. A specific analysis manner may be: the STA detects all capability elements of the beacon frame and obtains a data GI length supported by the AP by parsing an "HE supports GI" field; and the STA sets the available GI length according to the data GI length supported by the STA and the obtained data GI length supported by the AP. For example, assuming that data GI lengths indicated by information about the "HE supports GI" field are {0.8 us, 1.6 us, 2.4 us}, data GI lengths supported by the AP are {0.8 us, 1.6 us, 2.4 us}. GI lengths supported by the STA itself are {0.4 us, 0.8 us, 1.6 us, 2.4 us, 3.2 us}. It can be learned that data GI lengths supported by both the AP and the STA2 are {0.8 us, 1.6 us}, and in this case, {0.8 us, 1.6 us} are the available data GI length. In subsequent communication between the STA and the AP, a data GI length is selected from the available data GI length according to a channel condition, to construct a PPDU.

Optionally, after obtaining the available data GI length, the STA may perform data communication with the AP by using the available data GI length. Specifically, in subsequent communication between the STA and the AP, a data GI length is selected from the available data GI length according to the channel condition, to construct the PPDU.

Further, the STA generates an association request frame according to the available data GI length and sends the association request frame to the AP. The AP analyzes the association request frame after receiving the association request frame, and if the STA is allowed to access a network, returns an association response frame to the STA. The STA analyzes the association response frame after receiving the association response frame. In this case, the STA establishes an association with the AP, and subsequently the AP and the STA may perform data communication to transmit data.

The transceiver is further configured to obtain the first standard protocol data unit broadcast by the access device, and parse out the beacon frame from the first standard protocol data unit; or the transceiver is further configured to obtain the second standard protocol data unit broadcast by the access device, and parse out the beacon frame from the second standard protocol data unit; or the transceiver is further configured to obtain the first standard protocol data unit broadcast by the access device, determine the sending time of the second standard protocol data unit from the operation field in the first standard protocol data unit, obtain the second standard protocol data unit according to the sending time, and parse out the beacon frame from the second standard protocol data unit.

In this embodiment, an access device constructs a beacon frame, where the beacon frame includes a newly added field, and the newly added field represents multiple data guard interval lengths supported by the access device; the access device broadcasts the constructed beacon frame; and a terminal selects an available guard interval length matching a data guard interval length supported by the terminal from the beacon frame broadcast by the access device, and performs communication with the access device by using the available guard interval length. In this embodiment, in a standard that proposes multiple data guard interval lengths, multiple data guard interval lengths supported by an access device may be encapsulated into a newly added field of a beacon frame, so as to successfully implement data communication between the access device and a terminal.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments, and certainly is not intended to limit the protection scope. Therefore, equivalent variations made in accordance with the claims shall fall within the scope.

What is claimed is:

1. A data communication method, the method comprising:
encapsulating, by an access device, a first beacon frame into a first protocol data unit that conforms to a first standard;
encapsulating, by the access device, a second beacon frame into a second protocol data unit that conforms to a second standard; and
broadcasting, by the access device, the first protocol data unit and the second protocol data unit,
wherein the first protocol data unit includes a preamble and a first bearer data including the first beacon frame,
wherein a guard interval length of the preamble and a guard interval length of the first bearer data is a first guard interval length supported by the access device,
wherein the second protocol data unit includes a legacy preamble, a high efficiency wireless local area network preamble, and a second bearer data including the second beacon frame, and
wherein a guard interval length of the legacy preamble is the first guard interval length supported by the access device, and a guard interval length of the second bearer data is a second guard interval length supported by the access device.

2. The method according to claim 1, wherein the second guard interval length is a maximum guard interval length supported by the access device in the second standard.

3. The method according to claim 2, wherein the second standard is 802.11ax and the second guard interval length is 3.2 us.

4. The method according to claim 1, wherein the first guard interval length is a maximum guard interval length supported by the access device in the first standard.

5. The method according to claim 4, wherein the first guard interval length is 0.8 us.

6. The method according to claim 1, further comprising:
adding, by the access device, an operation field used to indicate a sending time of the second protocol data unit into the first protocol data unit before broadcasting the first protocol data unit and the second protocol data unit by the access device, wherein broadcasting the first protocol data unit and the second protocol data unit by the access device includes:
broadcasting, by the access device in a preset period, the first protocol data unit comprising the operation field; and
broadcasting, by the access device, the second protocol data unit at the sending time indicated by the operation field.

7. An access device comprising:
a processor; and
a non-transitory storage medium coupled to the processor and storing instructions for execution by the processor, the instructions, when executed by the processor, causing the access device to:
encapsulate a first beacon frame into a first standard protocol data unit that conforms to a first standard;
encapsulate a second beacon frame into a second protocol data unit that conforms to a second standard; and
broadcast the first protocol data unit and the second protocol data unit,
wherein the first protocol data unit includes a preamble and a first bearer data including the first beacon frame,
wherein a guard interval length of the preamble and a guard interval length of the first bearer data is a first guard interval length supported by the access device,
wherein the second protocol data unit includes a legacy preamble, a high efficiency wireless local area network preamble, and a second bearer data including the second beacon frame, and
wherein a guard interval length of the legacy preamble is the first guard interval length supported by the access device, and a guard interval length of the second bearer data is a second guard interval length supported by the access device.

8. The access device according to claim 7, wherein the second guard interval length is a maximum guard interval length supported by the access device in the second standard.

9. The access device according to claim 8, wherein the second standard is 802.11ax and the second guard interval length is 3.2 us.

10. The access device according to claim 7, wherein the first guard interval length is a maximum guard interval length supported by the access device in the first standard.

11. The access device according to claim 10, wherein the first guard interval length is 0.8 us.

12. The access device according to claim 7, wherein the storage medium further includes instructions, when being executed by the processor, further causing the access device to:
add an operation field used to indicate a sending time of the second protocol data unit into the first protocol data unit;
broadcast the first protocol data unit including the operation field in a preset period; and
broadcast the second protocol data unit at the sending time indicated by the operation field.

13. The access device according to claim 7, wherein the second beacon frame includes a field, the field comprising:
a first bit corresponding to a 3.2 us guard interval length and indicating whether or not the access device supports the 3.2 us guard interval length; and
a second bit corresponding to a 0.8 us guard interval length and indicating whether or not the access device supports the 0.8 us guard interval length.

14. A non-transitory computer-readable storage medium storing instructions for execution by a processor of an access device, the instructions, when executed by the processor, causing the access device to:
encapsulate a first beacon frame into a first protocol data unit that conforms to a first standard;
encapsulate a second beacon frame into a second protocol data unit that conforms to a second standard; and
broadcast the first protocol data unit and the second protocol data unit,
wherein the first protocol data unit includes a preamble and a first bearer data including the first beacon frame,
wherein a guard interval length of the preamble and a guard interval length of the first bearer data is a first guard interval length supported by the access device, wherein the second protocol data unit includes a legacy preamble, a high efficiency wireless local area network preamble, and a second bearer data including the second beacon frame, and wherein a guard interval length of the legacy preamble is the first guard interval length supported by the access device, and a guard interval length of the second bearer data is a second guard interval length supported by the access device.

15. The non-transitory computer-readable storage medium according to claim 14, wherein the second guard interval length is a maximum guard interval length supported by the access device in the second standard.

16. The non-transitory computer-readable storage medium according to claim 15, wherein the second standard is 802.11ax and the second guard interval length is 3.2 us.

17. The non-transitory computer-readable storage medium according to claim 14, wherein the first guard interval length is a maximum guard interval length supported by the access device in the first standard.

18. The non-transitory computer-readable storage medium according to claim 17, wherein the first guard interval length is 0.8 us.

19. The non-transitory computer-readable storage medium according to claim 14, wherein the storage medium further includes instructions, when being executed by the processor, further causing the access device to:
add an operation field used to indicate a sending time of the second protocol data unit into the first protocol data unit before broadcasting the first protocol data unit and the second protocol data unit,
broadcast, in a preset period, the first protocol data unit comprising the operation field; and
broadcast, the second protocol data unit at the sending time indicated by the operation field.

20. The non-transitory computer-readable storage medium according to claim 14, wherein the second beacon frame includes a field, the field comprising:
a first bit corresponding to a 3.2 us guard interval length and indicating whether or not the access device supports the 3.2 us guard interval length; and
a second bit corresponding to a 0.8 us guard interval length and indicating whether or not the access device supports the 0.8 us guard interval length.

* * * * *

UNITED STATES PATENT AND TRADEMARK OFFICE
CERTIFICATE OF CORRECTION

PATENT NO. : 10,873,436 B2
APPLICATION NO. : 16/390333
DATED : December 22, 2020
INVENTOR(S) : Ningjuan Wang Page 1 of 1

It is certified that error appears in the above-identified patent and that said Letters Patent is hereby corrected as shown below:

In the Claims

In Column 35, Line 66, Claim 7, delete "standard".

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*